(12) United States Patent
Ando et al.

(10) Patent No.: US 11,496,632 B2
(45) Date of Patent: Nov. 8, 2022

(54) IMAGE FORMING APPARATUS

(71) Applicant: CANON KABUSHIKI KAISHA, Tokyo (JP)

(72) Inventors: Yutaka Ando, Ibaraki (JP); Hiroto Nishihara, Ibaraki (JP); Yohei Katto, Chiba (JP); Akihiro Kawakita, Chiba (JP); Tomohiro Hasegawa, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/165,765

(22) Filed: Feb. 2, 2021

(65) Prior Publication Data

US 2021/0250448 A1 Aug. 12, 2021

(30) Foreign Application Priority Data

Feb. 10, 2020 (JP) .............................. JP2020-020659

(51) Int. Cl.
*H04N 1/46* (2006.01)
*H04N 1/00* (2006.01)

(52) U.S. Cl.
CPC ..... *H04N 1/00082* (2013.01); *H04N 1/00005* (2013.01); *H04N 1/00023* (2013.01); *H04N 1/00045* (2013.01); *H04N 1/00657* (2013.01)

(58) Field of Classification Search
None
See application file for complete search history.

(56) References Cited

U.S. PATENT DOCUMENTS

| 9,083,924 | B2* | 7/2015 | Takemura | H04N 1/6033 |
| 9,477,187 | B2* | 10/2016 | Takahashi | G01J 5/12 |
| 9,551,966 | B2 | 1/2017 | Hirota | |
| 2012/0189325 | A1* | 7/2012 | Kushima | G03G 15/00 399/9 |
| 2013/0094041 | A1* | 4/2013 | Takemura | H04N 1/6091 358/1.9 |
| 2013/0243451 | A1* | 9/2013 | Hirota | H04N 1/00031 399/39 |
| 2014/0176970 | A1* | 6/2014 | Iguchi | G06K 15/1868 358/1.9 |
| 2016/0373603 | A1* | 12/2016 | Ooishi | H04N 1/6091 |

FOREIGN PATENT DOCUMENTS

JP 2014112237 A 6/2014

* cited by examiner

*Primary Examiner* — Dung D Tran
(74) *Attorney, Agent, or Firm* — Canon U.S.A., Inc. IP Division

(57) ABSTRACT

An apparatus including: a forming unit configured to form a measurement image on a sheet; a fixing unit configured to fix the measurement image; a measurement unit provided downstream of the fixing unit in a sheet conveyance direction and configured to measure a color of the fixed measurement image; a detector configured to detect whether a cooling device having a cooling function valid is connected between the fixing unit and the measurement unit; and a controller configured to determine, in a case in which the color of the measurement image is measured, a time to be taken after the sheet has passed through the fixing unit until the measurement unit starts measuring the color of the measurement image based on a result of the detector, and to control sheet conveyance based on the determined time.

6 Claims, 18 Drawing Sheets

FIG. 4C

SHEET TYPE AND BASIS WEIGHT SETTING

PLAIN PAPER
- 64g~109g
- 110g~209g
- 210g~350g

SINGLE-SIDED COAT PAPER — 604
- 64g~109g
- 110g~209g
- 210g~350g

BOTH-SIDED COAT PAPER
- 64g~109g
- 110g~209g
- 210g~350g

RETURN | NEXT — 605

FIG. 4D

SHEET SIZE SETTING

606
- A4 | A4R | A3
- B5 | B4

RETURN | OK — 607

TABLE A

| BASIS WEIGHT(gsm) \ SURFACENESS | PLAIN PAPER | SINGLE-SIDED COAT PAPER | BOTH-SIDED COAT PAPER |
|---|---|---|---|
| 64~109 | 0 | 20 | 25 |
| 110~209 | 10 | 25 | 30 |
| 210~350 | 35 | 35 | 40 |

TABLE B

| BASIS WEIGHT(gsm) \ SURFACENESS | PLAIN PAPER | SINGLE-SIDED COAT PAPER | BOTH-SIDED COAT PAPER |
|---|---|---|---|
| 64~109 | 0 | 10 | 15 |
| 110~209 | 0 | 15 | 20 |
| 210~350 | 25 | 25 | 30 |

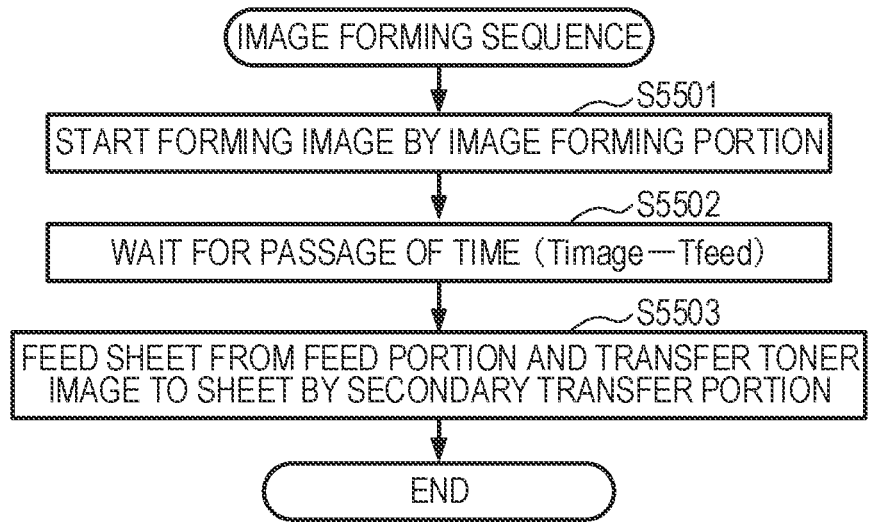
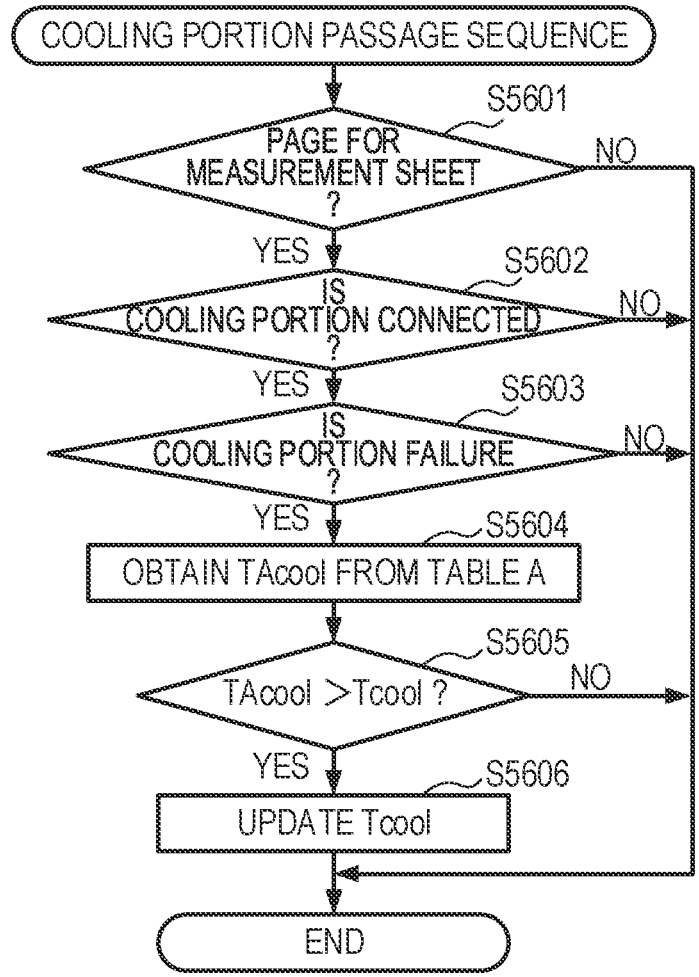

FIG. 12A
TABLE "a"

| BASIS WEIGHT(gsm) \ SURFACENESS | PLAIN PAPER | SINGLE-SIDED COAT PAPER | BOTH-SIDED COAT PAPER |
|---|---|---|---|
| 64~109 | 0 | 20 | 25 |
| 110~209 | 10 | 25 | 30 |
| 210~350 | 35 | 35 | 40 |

FIG. 12B
TABLE "b"

| BASIS WEIGHT(gsm) \ SURFACENESS | PLAIN PAPER | SINGLE-SIDED COAT PAPER | BOTH-SIDED COAT PAPER |
|---|---|---|---|
| 64~109 | 0 | 10 | 16 |
| 110~209 | 0 | 15 | 21 |
| 210~350 | 25 | 25 | 31 |

FIG. 12C
TABLE "c"

| BASIS WEIGHT(gsm) \ SURFACENESS | PLAIN PAPER | SINGLE-SIDED COAT PAPER | BOTH-SIDED COAT PAPER |
|---|---|---|---|
| 64~109 | 0 | 10 | 16 |
| 110~209 | 0 | 15 | 21 |
| 210~350 | 25 | 25 | 31 |

FIG. 12D
TABLE "d"

| BASIS WEIGHT(gsm) \ SURFACENESS | PLAIN PAPER | SINGLE-SIDED COAT PAPER | BOTH-SIDED COAT PAPER |
|---|---|---|---|
| 64~109 | 0 | 0 | 7 |
| 110~209 | 0 | 5 | 12 |
| 210~350 | 15 | 15 | 22 |

FIG. 14A
TABLE "a"

| BASIS WEIGHT(gsm) \ SURFACENESS | PLAIN PAPER | SINGLE-SIDED COAT PAPER | BOTH-SIDED COAT PAPER |
|---|---|---|---|
| 64~109 | 0 | 20 | 25 |
| 110~209 | 10 | 25 | 30 |
| 210~350 | 35 | 35 | 40 |

FIG. 14B
TABLE "b"

| BASIS WEIGHT(gsm) \ SURFACENESS | PLAIN PAPER | SINGLE-SIDED COAT PAPER | BOTH-SIDED COAT PAPER |
|---|---|---|---|
| 64~109 | 0 | 10 | 16 |
| 110~209 | 0 | 15 | 21 |
| 210~350 | 25 | 25 | 31 |

FIG. 14C
TABLE "c"

| BASIS WEIGHT(gsm) \ SURFACENESS | PLAIN PAPER | SINGLE-SIDED COAT PAPER | BOTH-SIDED COAT PAPER |
|---|---|---|---|
| 64~109 | 0 | 11 | 17 |
| 110~209 | 0 | 16 | 22 |
| 210~350 | 26 | 26 | 32 |

FIG. 14D
TABLE "d"

| BASIS WEIGHT(gsm) \ SURFACENESS | PLAIN PAPER | SINGLE-SIDED COAT PAPER | BOTH-SIDED COAT PAPER |
|---|---|---|---|
| 64~109 | 0 | 1 | 8 |
| 110~209 | 0 | 6 | 13 |
| 210~350 | 15 | 16 | 23 |

IMAGE FORMING APPARATUS

BACKGROUND OF THE DISCLOSURE

Field of the Disclosure

The aspect of the embodiments relates to an image forming apparatus having a color measurement function.

Description of the Related Art

Examples of image quality of image forming apparatus include graininess, uniformity within surface, character quality, and color reproduction (including color stability). In recent years in which multi-color image forming apparatus have become widespread, it is often said that the most important image quality is color reproduction, and hence a degree of demand for color reproduction (including stability) regarding an on-demand image forming apparatus is increasing. There is an image forming apparatus including a colorimeter of an in-line type in order to improve the color reproduction. The colorimeter is configured to read a patch image for measurement formed on a sheet by a color sensor provided in a conveyance path of the sheet, and perform, based on the read information, image adjustments including a density adjustment, a tone adjustment, and a multi-order color adjustment.

In U.S. Pat. No. 9,551,966, there is proposed an image forming apparatus which suppresses a thermochromism phenomenon in which an object to be measured formed on a sheet changes in color depending on its temperature, to thereby achieve highly accurate color matching and color stability. The image forming apparatus proposed in U.S. Pat. No. 9,551,966 is configured to cool the sheet by controlling, for example, the sheet to be stopped or a conveyance speed of the sheet to be lowered, in the conveyance path from a fixing portion to a colorimeter.

Meanwhile, there is proposed an image forming apparatus including a cooling member for cooling sheets in a conveyance path in order to suppress a phenomenon called "adhesion of discharged sheets" in which sheets adhere to each other when the sheets are stacked on a tray before releasing heat.

The image adjustment described above is often performed immediately before a job in which a user creates a printed product is started or when the image forming apparatus is activated. During the image adjustment, the user cannot execute a job for creating a printed product, and hence it is desired to shorten an image adjustment time. However, natural heat dissipation over time is considered regarding a sheet cooling time until the patch image is read by the color sensor in the related-art image forming apparatus, and hence a wasteful waiting time has occurred in the image forming apparatus including the cooling member.

SUMMARY OF THE DISCLOSURE

According to an aspect of the embodiments, there is provided an apparatus comprising: a forming unit configured to form a measurement image on a sheet; a fixing unit configured to heat the measurement image to fix the measurement image; a measurement unit which is provided downstream of the fixing unit in a conveyance direction of the sheet, and is configured to measure a color of the fixed measurement image; a detector configured to detect whether a cooling device having a cooling function valid is connected between the fixing unit and the measurement unit; and a controller configured to determine, in a case in which the color of the measurement image is measured, a time to be taken after the sheet has passed through the fixing unit until the measurement unit starts measuring the color of the measurement image based on a result obtained by the detector, and to control conveyance of the sheet based on the determined time.

Further features of the present disclosure will become apparent from the following description of exemplary embodiments with reference to the attached drawings.

BRIEF DESCRIPTION OF THE DRAWINGS

FIG. 4A, FIG. 4B, FIG. 4C, and FIG. 4D are diagrams for illustrating a sheet information setting screen displayed on a user interface.

FIG. 9A, FIG. 9B, and FIG. 9C are flow charts of subroutines of the print page sequence.

FIG. 12A, FIG. 12B, FIG. 12C, FIG. 12D, and FIG. 12E are explanatory tables and flow chart of a cooling time obtaining sequence in the second embodiment.

FIG. 14A, FIG. 14B, FIG. 14C, and FIG. 14D are another example of tables showing a relationship among a basis weight, a sheet type, and a cooling time.

DESCRIPTION OF THE EMBODIMENTS

First Embodiment

Description is made of a first embodiment.
(Image Forming Apparatus)

Figure 1:
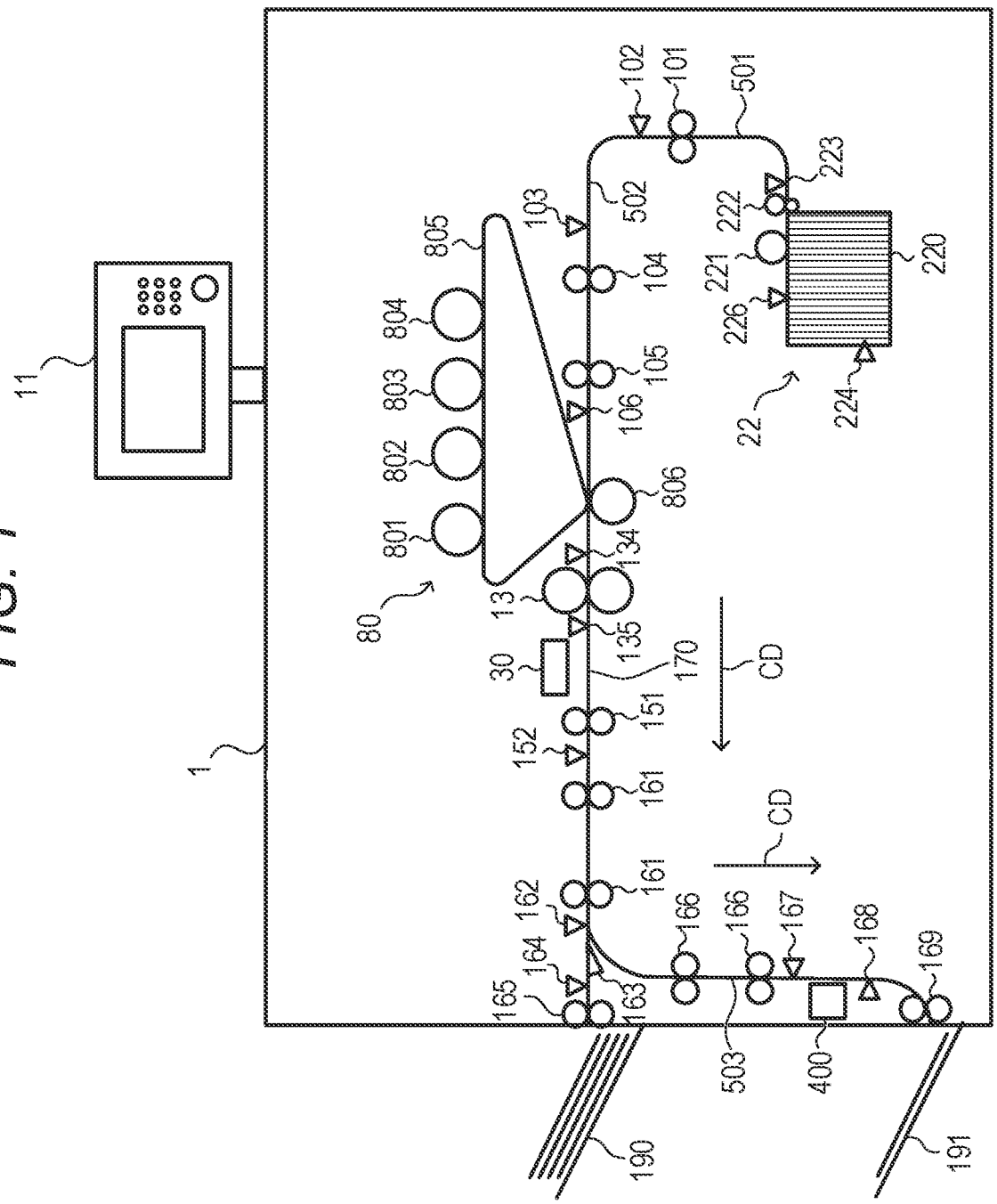
FIG. 1 is a cross-sectional view of an image forming apparatus according to a first embodiment.

FIG. 1 is a cross-sectional view of an image forming apparatus according to the first embodiment. An image forming apparatus 1 includes a user interface 11 including a display and input keys. A user gives a print instruction for copying or another such operation from the user interface 11. When the user gives a print instruction, sheets are fed one by one from a feed portion 22 configured to store a plurality of sheets. The sheets are stored in a sheet storage (cassette) 220. In the sheet storage 220, a lifter motor (not shown) and a sheet surface sensor 226 control a position of a surface of an uppermost sheet so as to bring the uppermost sheet into contact with a pick-up roller 221.

A sheet remaining amount sensor 224 is an optical sensor configured to detect that a remaining amount of the sheets stored in the sheet storage 220 has become smaller. When a sensor light-receiving portion of the sheet remaining amount sensor 224 is shielded from light by the sheets, it is determined that the remaining amount of the sheets in the sheet storage 220 is equal to or larger than a predetermined amount. When the sensor light-receiving portion of the sheet remaining amount sensor 224 is receiving light from a light-emitting portion, it is determined that the remaining amount of the sheets in the sheet storage 220 is smaller than the predetermined amount. The pick-up roller 221 is configured to pick up the uppermost sheet in the sheet storage 220 to feed the uppermost sheet to a feed roller pair 222. An upper roller of the feed roller pair 222 is rotated in a feeding direction, and a lower roller of the feed roller pair 222 is rotated in a returning direction, to thereby cause the feed roller pair 222 to feed the sheets one by one by separating the sheets one from another.

It is determined based on a detection signal of a path sensor (feed sensor) 223 whether or not the uppermost sheet has been fed at a predetermined timing. When a leading edge of the sheet does not reach the path sensor 223 and the path sensor 223 is not turned on even after a predetermined time has elapsed since the pick-up roller 221 started the pick-up, the image forming apparatus 1 stops its operation due to a jam. When a trailing edge of the sheet does not pass through the path sensor 223 and the path sensor 223 is not turned off even after a predetermined time has elapsed since the path sensor 223 was turned on, the image forming apparatus 1 also stops its operation due to a jam (retention jam).

The sheet is conveyed to a vertical path 501 by the feed roller pair 222. The sheet is passed through a path sensor 102 by a vertical path roller pair 101 to be guided to a horizontal path 502. The sheet is conveyed to a secondary transfer portion 806 by a pre-registration roller pair 104 and a registration roller pair 105. In an image forming portion 80 serving as an image forming unit, toner images formed on photosensitive drums 801, 802, 803, and 804 are transferred onto an intermediate transfer member 805.

The leading edge of the sheet is registered with a tip of the toner images on the intermediate transfer member 805 by the pre-registration roller pair 104 and the registration roller pair 105 based on detection signals of a path sensor 103 and a path sensor 106. The registration between the tip of the toner images and the leading edge of the sheet is achieved by driving the registration roller pair 105 based on a signal synchronized with image formation. The toner images on the intermediate transfer member 805 are transferred onto the sheet by the secondary transfer portion 806.

Figure 2:
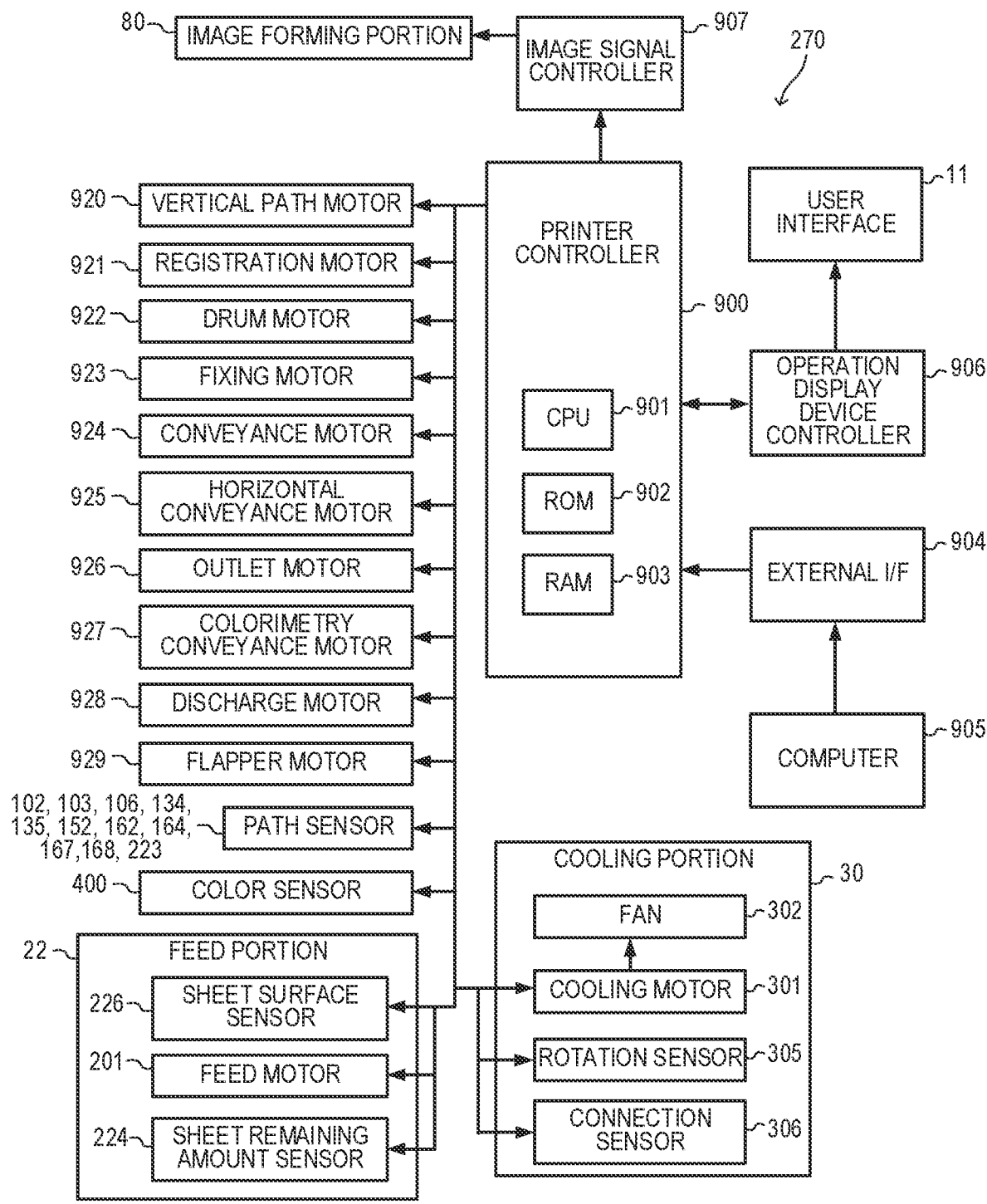
FIG. 2 is a block diagram of a controller in the first embodiment.

The sheet onto which the toner images have been transferred is pressurized and heated by a fixing portion 13 serving as a fixing unit, and the toner images are fixed to the sheet. The sheet to which the toner images have been fixed is cooled by a cooling portion 30 serving as a cooling device, and is then conveyed downstream by a conveyance roller pair 151. The cooling portion 30 includes a cooling fan (hereinafter referred to as "fan") 302 as illustrated in FIG. 2. The cooling portion 30 is configured to drive the fan 302 to send air toward a conveyance path 170, to thereby cool the conveyance path 170 and the sheet passing through the conveyance path 170. The fan 302 in the first embodiment is configured to send air to the conveyance path 170 and the sheet passing through the conveyance path 170. However, the cooling portion 30 may be configured to cause the fan 302 to cool a belt and convey the sheet by the cooled belt, to thereby cool the sheet. After that, the sheet is conveyed by the conveyance roller pair 151, horizontal conveyance roller pairs 161, and an outlet roller pair 165 to be stacked on a discharge tray 190.

In a case of a sheet on which a patch image has been formed, a flapper 163 is switched to a direction for guiding the sheet to a colorimetric path 503 including a color sensor 400. The color sensor 400 is a measurement unit, which is provided downstream of the fixing portion 13 in a sheet conveyance direction CD, and is configured to measure a color of the patch image (measurement image) fixed to the sheet. The sheet on which the patch image has been formed is conveyed by colorimetry conveyance roller pairs 166. The color sensor 400 reads the patch image formed on the sheet. The sheet (measurement sheet) on which the patch image has been formed is discharged onto a measurement sheet discharge tray 191 by a discharge roller pair 169.

(Controller)

FIG. 2 is a block diagram of a controller 270 in the first embodiment. The controller 270 is configured to control the entire image forming apparatus 1. The controller 270 includes a printer controller 900. The printer controller 900 includes a CPU 901, a ROM (storage) 902, and a RAM (storage) 903. The printer controller 900 centrally controls an image signal controller 907, an operation display device controller 906, and various motors provided to the image forming apparatus 1 in accordance with a control program stored in the ROM 902. The RAM 903 is configured to temporarily store control data, and is used as a work area for arithmetic operation processing involved in the control.

The image signal controller 907 is configured to perform various kinds of processing on a digital image signal input from a computer 905 through an external interface (external I/F) 904 and convert the digital image signal into a video signal to output the video signal to the image forming portion 80. The operation display device controller 906 is configured to control the user interface 11 to exchange information with the printer controller 900. The user interface 11 includes a plurality of keys for setting various functions relating to image formation and a display for displaying information indicating a setting state. In addition, the user interface 11 is configured to output a key signal corresponding to each key operation to the printer controller 900, and also display the corresponding information on the display based on a signal received from the printer controller 900.

(Sheet Conveyance Drive System)

Next, a sheet conveyance drive system of the image forming apparatus 1 is described with reference to FIG. 1 and FIG. 2. The image forming apparatus 1 includes a feed motor 201 and a vertical path motor 920 as drive sources for a section from the feed portion 22 to the vertical path 501. The feed motor 201 is provided to the feed portion 22, and is configured to drive the pick-up roller 221. The vertical path motor 920 is configured to drive the feed roller pair 222 and the vertical path roller pair 101. The feed portion 22 includes the sheet remaining amount sensor 224 configured to detect that the remaining amount of the sheets stored in the sheet storage 220 has become smaller than the predetermined amount. The image forming apparatus 1 includes a registration motor 921 as a drive source for a section from the horizontal path 502 to the secondary transfer portion 806. The registration motor 921 is configured to drive the pre-registration roller pair 104 and the registration roller pair 105.

The image forming apparatus 1 includes a drum motor 922 and a fixing motor 923 as drive sources for a section from the secondary transfer portion 806 to the fixing portion 13. The drum motor 922 is configured to drive the photosensitive drums 801, 802, 803, and 804, the intermediate transfer member 805, and the secondary transfer portion 806, which are included in the image forming portion 80. The fixing motor 923 is configured to drive the fixing portion 13. The image forming apparatus 1 includes a conveyance motor 924, a horizontal conveyance motor 925, and an outlet motor 926 as drive sources for a section from the fixing portion 13 to the discharge tray 190 serving as a discharge portion. The conveyance motor 924 is configured to drive the conveyance roller pair 151. The horizontal conveyance motor 925 is configured to drive the horizontal conveyance roller pairs 161. The outlet motor 926 is configured to drive the outlet roller pair 165. The image forming apparatus 1 also includes a colorimetry conveyance motor 927 and a discharge motor 928 as a drive source for the colorimetric path 503. The colorimetry conveyance motor 927 is configured to drive the colorimetry conveyance roller pairs 166. The discharge motor 928 is configured to drive the discharge roller pair 169.

In addition, the image forming apparatus 1 includes path sensors 102, 103, 106, 134, 135, 152, 162, 164, 167, 168, and 223 in order to detect the passage of the sheet. Detection signals of the path sensors 102, 103, 106, 134, 135, 152, 162, 164, 167, 168, and 223 are input to the printer controller 900. The image forming apparatus 1 includes a flapper motor 929 configured to drive the flapper 163 in order to switch the flapper 163 to switch the sheet conveyance direction CD.

(Cooling Portion)

Next, the cooling portion 30 is described with reference to FIG. 1 and FIG. 2. The cooling portion 30 is selectively connected to the image forming apparatus 1. That is, the image forming apparatus 1 can execute image formation even when the cooling portion 30 is not mounted to the image forming apparatus 1. The cooling portion 30 includes a connection sensor 306, the fan 302, a cooling motor 301, and a rotation sensor 305. The connection sensor 306 serving as a connection detector is configured to detect whether or not the cooling portion 30 is mounted to the image forming apparatus 1. The cooling motor 301 is configured to drive the fan 302. The rotation sensor 305 serving as an operation detector is configured to detect whether or not the fan 302 is operating (rotating).

When the rotation sensor 305 does not detect that the fan 302 is rotating even after a predetermined time has elapsed since the driving of the fan 302 was started, the printer controller 900 determines that the fan 302 has failed, and stores failure information into the RAM 903. When the failure information of the fan 302 is stored into the RAM 903, the printer controller 900 causes the operation display device controller 906 to display on the user interface 11 that the fan 302 has failed. However, even when the fan 302 fails, the failure exerts no influence on the conveyance of the sheet, and hence a print job is not prohibited.

(Color Sensor)

Figure 3:
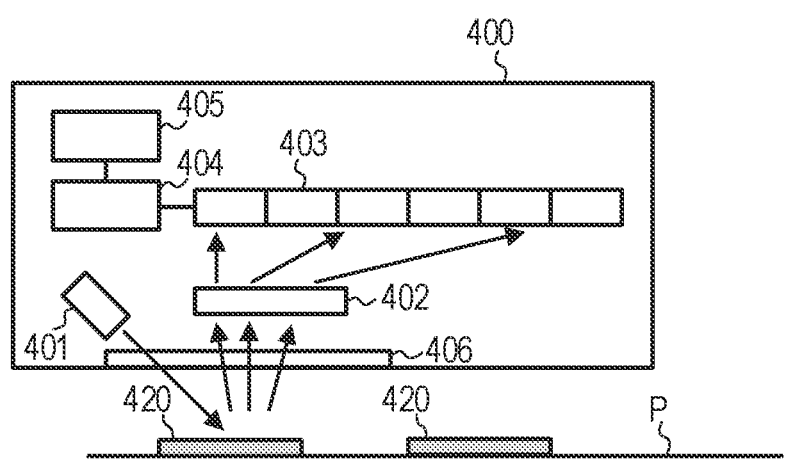
FIG. 3 is an explanatory diagram of a color sensor.
Figure 4A:
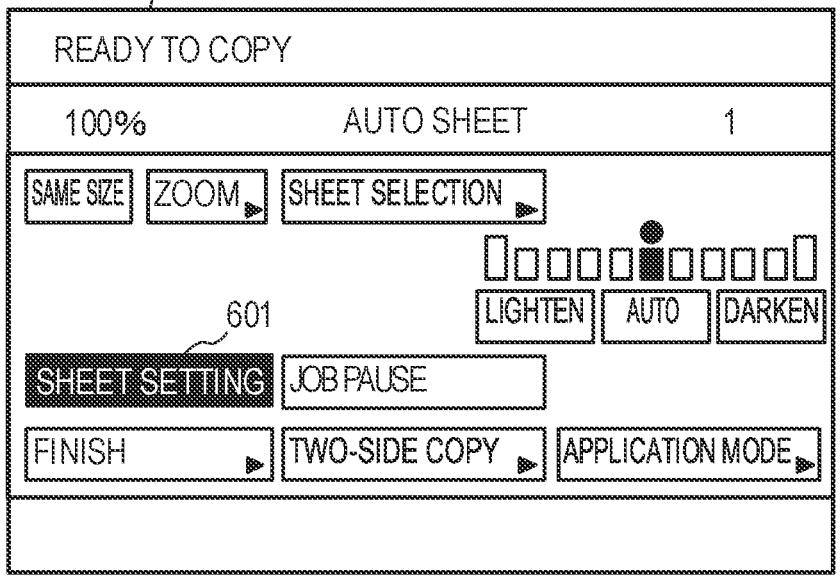
Figure 4B:
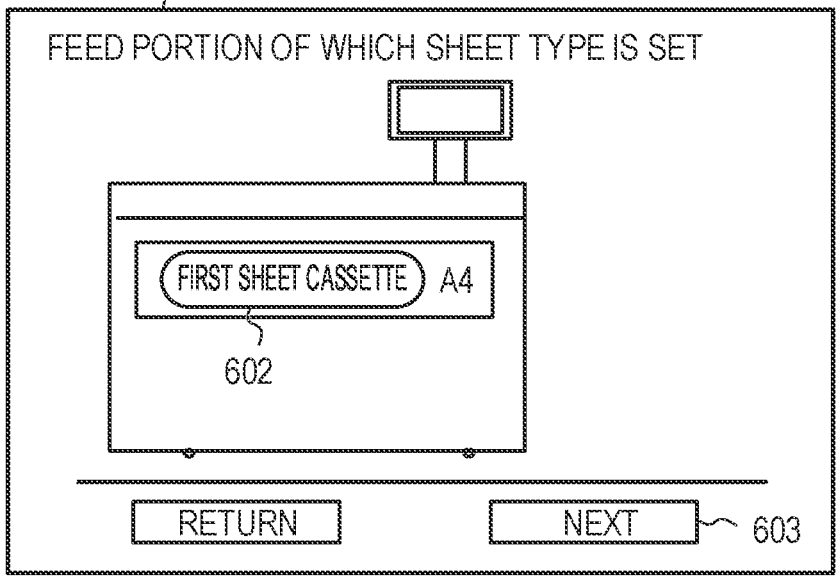

Next, the color sensor 400 is described with reference to FIG. 3. FIG. 3 is an explanatory diagram of the color sensor 400. The color sensor 400 includes a white LED 401, a diffraction grating 402, a line sensor 403, an arithmetic unit 404, a memory 405, and a lens 406. The white LED 401 is a light-emitting element configured to illuminate a patch image (toner patch) 420 (measurement image) formed on a sheet P and the sheet P with light. The lens 406 is configured to condense the light emitted from the white LED 401 onto the patch image 420 and the sheet P, and the light reflected by the patch image 420 and the sheet P is condensed onto the diffraction grating 402. The lens 406 may be omitted.

The diffraction grating 402 is a spectroscopic component configured to spectrally disperse the light reflected by the patch image 420 and the sheet P for each wavelength. The line sensor 403 is a light-detecting element including "n" pixels (light-receiving elements) configured to detect light decomposed for each wavelength by the diffraction grating 402. The arithmetic unit 404 performs various arithmetic operations based on a light intensity value of each pixel detected by the line sensor 403. The memory 405 is configured to store various kinds of data to be used by the arithmetic unit 404. For example, the arithmetic unit 404 has a function of calculating a spectral reflectance and a Lab value representing a color tint value based on the spectrally dispersed light intensity value. The arithmetic unit 404 stores an arithmetic operation result into the RAM 903.

(Method of Setting Sheet Information)

Now, a method of setting sheet information including a sheet size, a sheet type, and a basis weight of the sheets stored in the sheet storage 220 is described with reference to FIG. 4A, FIG. 4B, FIG. 4C, and FIG. 4D. FIG. 4A, FIG. 4B, FIG. 4C, and FIG. 4D are diagrams for illustrating a feed portion setting screen displayed on the user interface 11. The first embodiment is described by taking an exemplary case in which the sheets stored in the sheet storage 220 are single-sided coat paper having a basis weight of 150 g/m$^2$ and the A4 size. When the user presses a "sheet selection" button on an initial screen displayed on the user interface 11 illustrated in FIG. 4A and then presses a "sheet setting" button 601, the CPU 901 causes a screen of the user interface 11 to transition to the feed portion setting screen illustrated in FIG. 4B. First, it is selected which feed portion 22 the sheet type is to be set for.

First, the user presses a "first sheet cassette" button 602 and then presses a "next" button 603. Incidentally, on the user interface 11, the sheet storage 220 is expressed as "first sheet cassette." In the first embodiment, it is described that there is one sheet storage 220, but there may be a plurality of sheet storages 220. When the "next" button 603 is pressed, the CPU 901 causes the screen of the user interface 11 to transition to a sheet type and basis weight setting screen illustrated in FIG. 4C. In this case, the user selects a "110 g to 209 g" button 604 of the single-sided coat paper, and then a "next" button 605 is pressed. When the "next" button 605 is pressed, the CPU 901 causes the screen of the user interface 11 to transition to a sheet size setting screen illustrated in FIG. 4D. In this case, when the user presses an "A4" button 606 and then presses an "OK" button 607, the CPU 901 causes the screen of the user interface 11 to transition to the initial screen illustrated in FIG. 4A, and brings the setting of the sheet information to an end.

(Method of Executing Adjustment Mode)

Now, a method of executing an adjustment mode involved in the color measurement is described with reference to FIG. 5A, FIG. 5B, FIG. 5C, and FIG. 5D. FIG. 5A, FIG. 5B, FIG. 5C, and FIG. 5D are diagrams for illustrating an adjustment mode execution screen displayed on the user interface 11. When the user presses an "application mode" button 611 of the user interface 11 illustrated in FIG. 5A, the CPU 901 causes the screen of the user interface 11 to transition to an application mode selection screen illustrated in FIG. 5B. When the user presses an "adjustment" button 612 on the application mode selection screen illustrated in FIG. 5B, the CPU 901 causes the screen of the user interface 11 to transition to an adjustment mode selection screen illustrated in FIG. 5C. Meanwhile, when the user presses a "close" button 613 on the application mode selection screen illustrated in FIG. 5B without selecting any mode, the CPU 901 causes the screen of the user interface 11 to return to the screen illustrated in FIG. 5A.

Figure 5A:
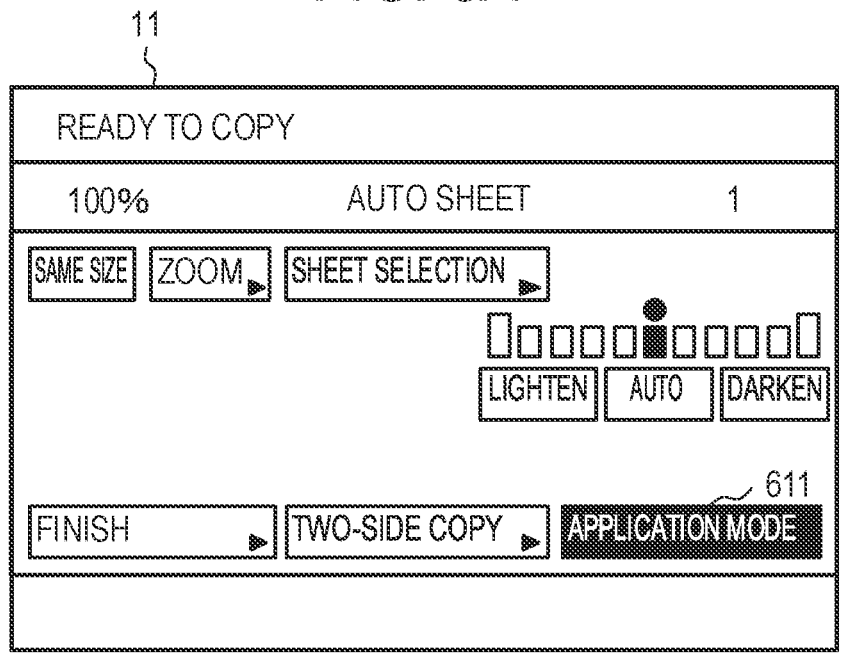
FIG. 5A, FIG. 5B, FIG. 5C, and FIG. 5D are diagrams for illustrating an adjustment mode execution screen displayed on the user interface.
Figure 5B:
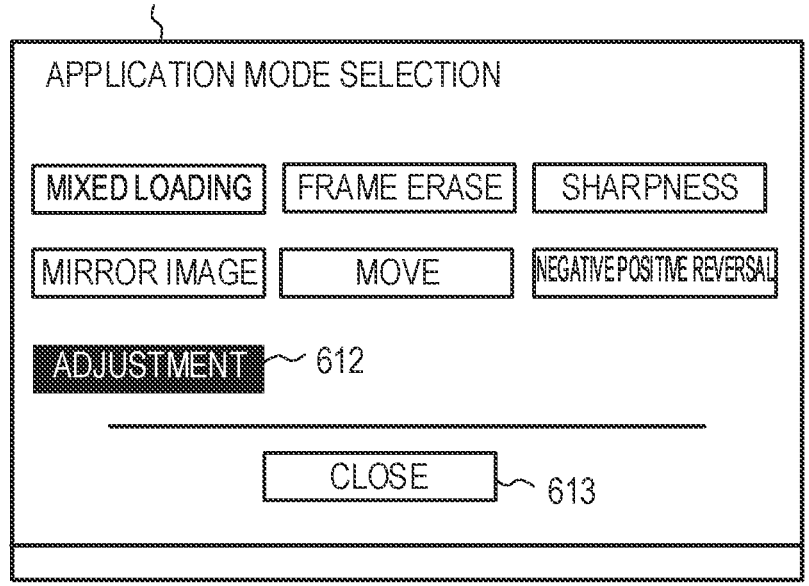
Figure 5C:
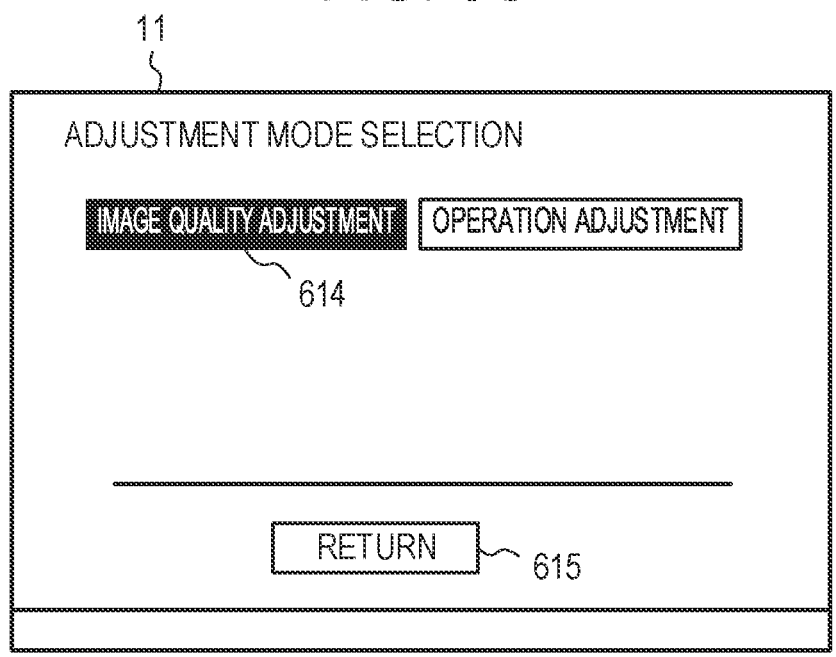
Figure 5D:
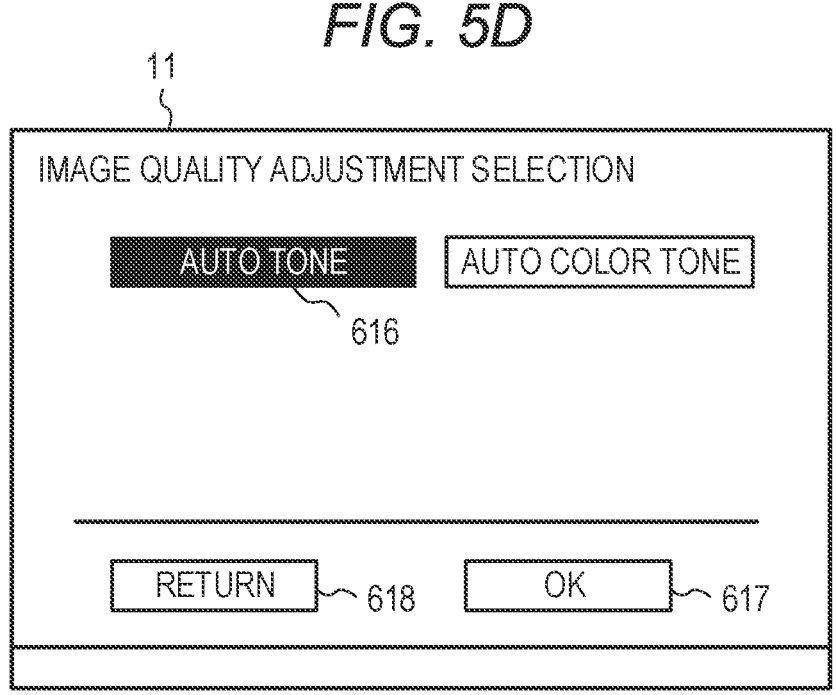

When the user presses an "image quality adjustment" button 614 on the adjustment mode selection screen illustrated in FIG. 5C, the CPU 901 causes the screen of the user interface 11 to transition to an image quality adjustment selection screen illustrated in FIG. 5D. Meanwhile, when the user presses a "return" button 615 on the adjustment mode selection screen illustrated in FIG. 5C, the CPU 901 causes the screen of the user interface 11 to return to the application mode selection screen illustrated in FIG. 5B. When the user presses an "OK" button 617 with the adjustment mode of any one of "auto tone" button 616 and "auto color tone" button having been selected on the image quality adjustment selection screen illustrated in FIG. 5D, a print job of forming a patch image to be read by the color sensor 400 is started to execute the adjustment mode. In this case, when the user presses a "return" button 618, the CPU 901 causes the screen of the user interface 11 to return to the adjustment mode selection screen illustrated in FIG. 5C. In the first embodiment, the adjustment modes of the image quality adjustment selection screen are merely an example, and there may be other adjustment modes.

(Print Sequence)

Figure 6:
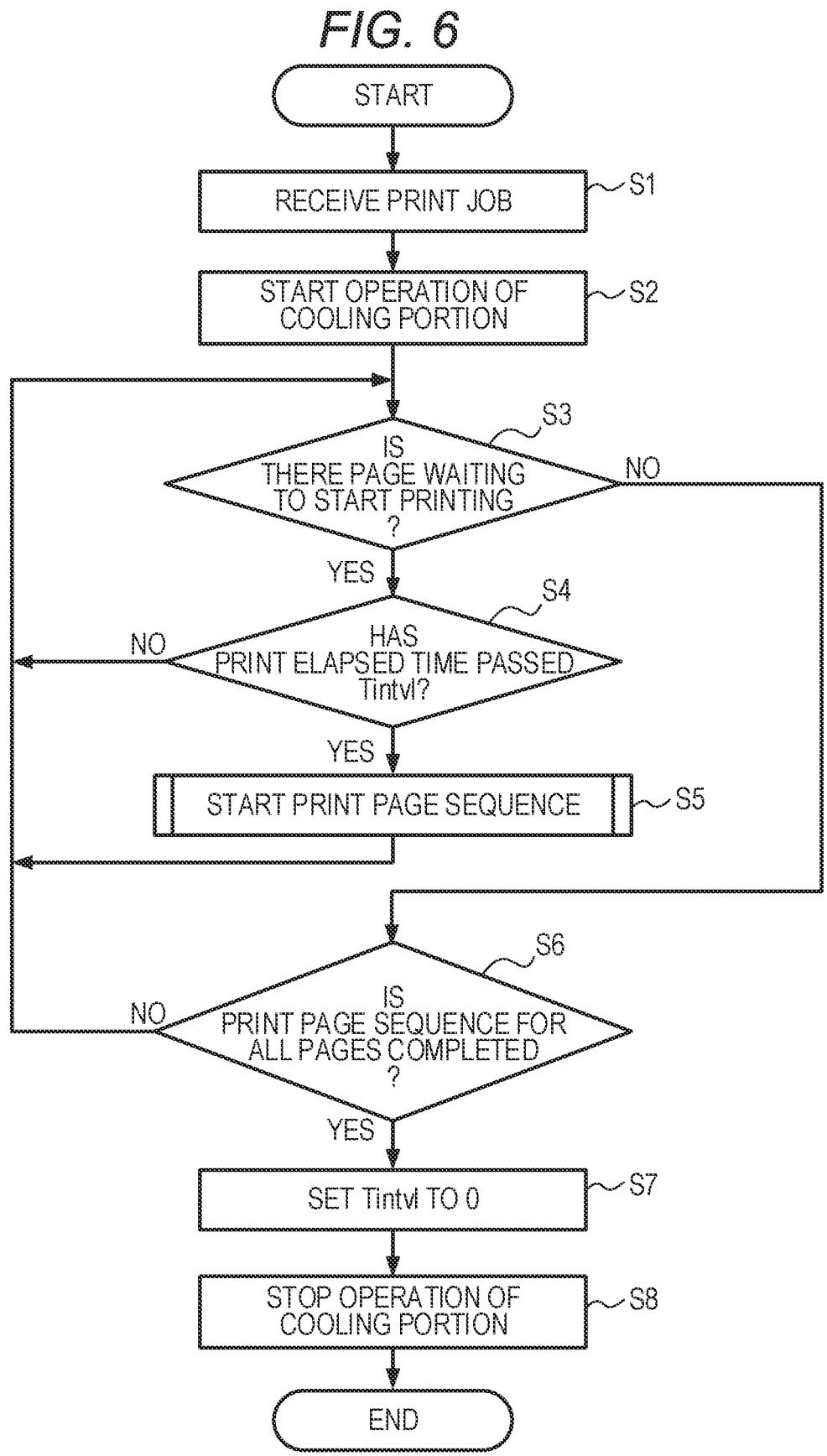
FIG. 6 is a flow chart for illustrating a print sequence.

Now, a print sequence of the printer controller 900 in the image forming apparatus 1 is described with reference to FIG. 6. FIG. 6 is a flow chart for illustrating the print sequence. The CPU 901 of the printer controller 900 executes the print sequence in accordance with the control program stored in the ROM 902. When the CPU 901 receives a print job (Step S1), an operation of the cooling portion 30 is started (Step S2).

The CPU 901 determines whether or not there is a page waiting to start printing (Step S3). When there is a page waiting to start printing (YES in Step S3), the CPU 901 determines whether or not a print elapsed time measured by a built-in timer (not shown) of the CPU 901 has passed a print time interval (hereinafter referred to as "print interval") Tintvl (Step S4). When the print elapsed time has not passed the print interval Tintvl (NO in Step S4), the CPU 901 returns the processing to Step S3. When the print elapsed time has passed the print interval Tintvl (YES in Step S4), the CPU 901 advances the processing to Step S5. This enables printing to be performed on a plurality of sheets continuously at the print interval Tintvl. When the image forming apparatus 1 is powered on, the print interval Tintvl is set to 0.

The CPU 901 starts a print page sequence (Step S5). The print page sequence is described later with reference to FIG. 7. The print page sequence is processed in parallel with the print sequence. When the print page sequence is completed, the CPU 901 returns the processing to Step S3. As long as there is a page waiting to start printing, the CPU 901 repeats the processing of Step S3, Step S4, and Step S5. When there is no page waiting to start printing (NO in Step S3), the CPU 901 determines whether or not the print page sequence for all pages is completed (Step S6). When the print page sequence for all pages is not completed (NO in Step S6), the CPU 901 returns the processing to Step S3. When the print page sequence for all pages is completed (YES in Step S6), the print interval Tintvl is set to 0 (Step S7). The CPU 901 stops the operation of the cooling portion 30 (Step S8) to bring the print sequence to an end.

(Print Page Sequence)

Figure 7:
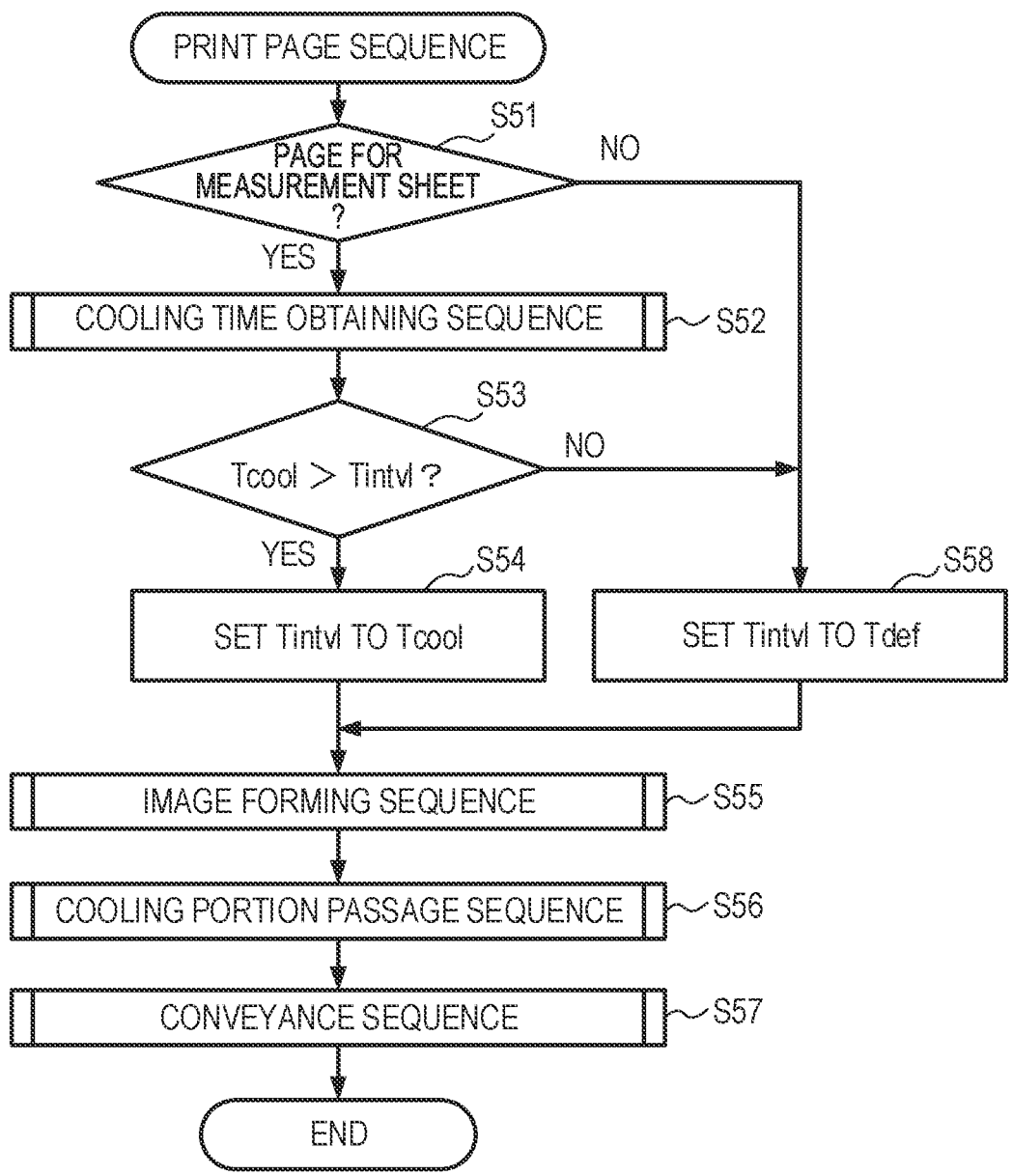
FIG. 7 is a flow chart for illustrating a print page sequence.

Now, the print page sequence executed in Step S5 of FIG. 6 is described with reference to FIG. 7. FIG. 7 is a flow chart for illustrating the print page sequence. First, the CPU 901 determines whether or not a print page is a page for a measurement sheet from which a patch image is to be read by the color sensor 400 (Step S51). When the print page is a page for a non-measurement sheet (NO in Step S51), the CPU 901 sets the print interval Tintvl to a predetermined print interval Tdef for a case of a non-measurement sheet (Step S58). The CPU 901 advances the processing to Step S55.

Meanwhile, when the print page is a page for a measurement sheet (YES in Step S51), the CPU 901 executes the cooling time obtaining sequence (Step S52). The CPU 901 serving as a determining unit determines a cooling time Tcool for cooling a sheet in the cooling time obtaining sequence. The cooling time Tcool is a time to be taken after the measurement sheet has passed through the fixing portion 13 until the color sensor 400 starts measuring a color of the patch image on the measurement sheet. The cooling time obtaining sequence is described later with reference to FIG. 8A, FIG. 8B, and FIG. 8C. The CPU 901 compares the cooling time Tcool obtained in Step S52 with the print interval Tintvl (Step S53). When the cooling time Tcool is greater than the print interval Tintvl (YES in Step S53), the CPU 901 sets the print interval Tintvl to the cooling time Tcool (Step S54). When the cooling time Tcool is equal to or less than the print interval Tintvl (NO in Step S53), the CPU 901 sets the print interval Tintvl to the predetermined print interval Tdef for the case of a non-measurement sheet (Step S58). In this manner, the print interval Tintvl between a preceding sheet and a succeeding sheet is appropriately set, to thereby prevent a collision therebetween and prevent an unnecessary loss of productivity.

The CPU 901 executes an image forming sequence (Step S55) to form an image on the sheet. The CPU 901 executes a cooling portion passage sequence (Step S56) and a conveyance sequence (Step S57), and discharges the sheet to the outside of the image forming apparatus 1. When the conveyance sequence (Step S57) is completed and the sheet is discharged to the outside of the image forming apparatus 1, the CPU 901 brings the print page sequence to an end. The image forming sequence (Step S55), the cooling portion passage sequence (Step S56), and the conveyance sequence (Step S57) are described later with reference to FIG. 9A, FIG. 9B, and FIG. 9C.

(Cooling Time Obtaining Sequence)

Figures 8A, 8B, 8C:
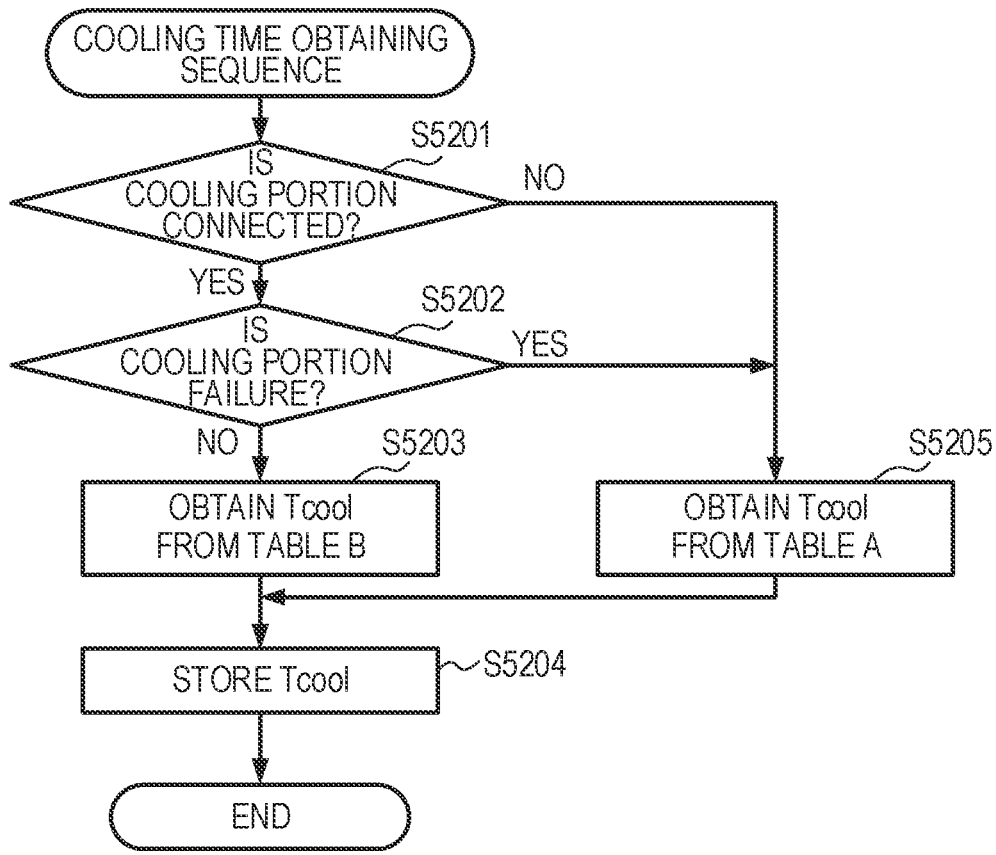
FIG. 8A, FIG. 8B, and FIG. 8C are explanatory tables and flow chart of a cooling time obtaining sequence.

Now, the cooling time obtaining sequence executed in Step S52 of FIG. 7 is described with reference to FIG. 8A, FIG. 8B, and FIG. 8C. FIG. 8A, FIG. 8B, and FIG. 8C are explanatory tables and flow chart of the cooling time obtaining sequence. FIG. 8A and FIG. 8B are Table A and Table B, respectively, each of which is a cooling time table showing a relationship among the basis weight, the sheet type, and the cooling time Tcool. FIG. 8C is a flow chart for illustrating the cooling time obtaining sequence. The CPU 901 obtains the cooling time Tcool for cooling a sheet from Table A shown in FIG. 8A and Table B shown in FIG. 8B in accordance with the cooling time obtaining sequence illustrated in FIG. 8C.

When the cooling time obtaining sequence is started, the CPU 901 determines whether or not the cooling portion 30 is connected to the image forming apparatus 1 based on a detection signal of the connection sensor 306 (Step S5201). When the cooling portion 30 is connected to the image forming apparatus 1 (YES in Step S5201), the CPU 901 refers to the failure information of the cooling portion 30 stored in the RAM 903 to determine whether or not the cooling portion 30 has failed (Step S5202). When the cooling portion 30 has not failed (NO in Step S5202), the CPU 901 obtains the cooling time Tcool from Table B shown in FIG. 8B based on the set basis weight and sheet type (Step S5203). That is, the CPU 901 determines whether or not there is a cooling portion 30 having a cooling function valid. When, as a result of the determination, there is a cooling portion 30 having the cooling function valid, the CPU 901 determines the cooling time Tcool (first time) from Table B.

When the cooling portion 30 is not connected to the image forming apparatus 1 (NO in Step S5201), the CPU 901 obtains the cooling time Tcool from Table A shown in FIG. 8A based on the set basis weight and sheet type (Step S5205). In addition, when the cooling portion 30 has failed (YES in Step S5202), the CPU 901 obtains the cooling time Tcool from Table A shown in FIG. 8A based on the set basis weight and sheet type (Step S5205). That is, the CPU 901 determines the cooling time Tcool (second time) from Table A when there is no cooling portion 30 having the cooling function valid. In one embodiment, the cooling time Tcool (first time) of Table B is shorter than the cooling time Tcool (second time) of Table A (except when the cooling time of Table A is 0).

The CPU 901 stores the obtained cooling time Tcool into the RAM 903 (Step S5204). The CPU 901 brings the cooling time obtaining sequence to an end. According to the first embodiment, the cooling time Tcool is changed based on a valid state or an invalid state of the cooling function of the cooling portion 30, to thereby be able to optimize a time from image formation to patch image reading.

(Image Forming Sequence)

Now, the image forming sequence executed in Step S55 of FIG. 7 is described with reference to FIG. 9A. FIG. 9A is a flow chart for illustrating the image forming sequence. When the image forming sequence is started, the CPU 901 causes the image forming portion 80 to start the image formation (Step S5501). A toner image is formed on the intermediate transfer member 805 by the image forming portion 80. The CPU 901 waits for the lapse of a time obtained by subtracting a time Tfeed to be taken by the sheet conveyed from the feed portion 22 to reach the secondary transfer portion 806 from a time Timage to be taken by the toner image on the intermediate transfer member 805 to reach the secondary transfer portion 806 (Step S5502). After a time (Timage-Tfeed) has elapsed, the sheet is fed from the feed portion 22, and the toner image is transferred to the sheet by the secondary transfer portion 806 (Step S5503). Then, the CPU 901 brings the image forming sequence to an end.

(Cooling Portion Passage Sequence)

Now, the cooling portion passage sequence executed in Step S56 of FIG. 7 is described with reference to FIG. 8A and FIG. 9B. FIG. 9B is a flow chart for illustrating the cooling portion passage sequence. When the cooling portion passage sequence is started, the CPU 901 determines whether or not the print page is a page for a measurement sheet from which a patch image is to be read by the color sensor 400 (Step S5601). When the print page is a page for a measurement sheet (YES in Step S5601), the CPU 901 determines whether or not the cooling portion 30 is connected to the image forming apparatus 1 based on the detection signal of the connection sensor 306 (Step S5602).

When the cooling portion 30 is connected to the image forming apparatus 1 (YES in Step S5602), the CPU 901 refers to the failure information of the cooling portion 30 stored in the RAM 903 to determine whether or not the cooling portion 30 has failed (Step S5603). When the cooling portion 30 has failed (YES in Step S5603), the CPU 901 obtains a cooling time TAcool from Table A shown in FIG. 8A based on the set basis weight and sheet type (Step S5604). In the same manner as the cooling time Tcool, the cooling time TAcool is a time to be taken after the measurement sheet has passed through the fixing portion 13 until the color sensor 400 starts measuring the color of the patch image on the measurement sheet.

The CPU 901 compares the cooling time TAcool obtained in Step S5604 with the cooling time Tcool stored in the RAM 903 in the cooling time obtaining sequence (Step S5605). When the obtained cooling time TAcool is greater than the stored cooling time Tcool (YES in Step S5605), the CPU 901 updates the stored cooling time Tcool with the obtained cooling time TAcool (Step S5606). Then, the CPU 901 brings the cooling portion passage sequence to an end.

There is a conceivable case in which the cooling portion 30 did not fail at a time of executing the cooling time obtaining sequence but later fails during the execution of the image forming sequence. In this case, the sheet is not cooled by the cooling portion 30, and hence the sheet is not sufficiently cooled within the cooling time Tcool determined at the time of executing the cooling time obtaining sequence, and the measurement cannot be correctly performed by the color sensor 400. In view of this, the state of the cooling portion 30 is re-examined in the cooling portion passage sequence, and the cooling time Tcool is updated when the cooling portion 30 has failed.

When the cooling portion 30 is not connected to the image forming apparatus 1 (NO in Step S5602) and when the cooling portion 30 has not failed (NO in Step S5603), the same cooling time Tcool as the cooling time Tcool obtained in the cooling time obtaining sequence is obtained. In view of this, the CPU 901 brings the cooling portion passage sequence to an end without updating the cooling time Tcool. In addition, when the obtained cooling time TAcool is equal to or less than the stored cooling time Tcool (NO in Step S5605), the CPU 901 brings the cooling portion passage sequence to an end without updating the cooling time Tcool.

When the print page is not a page for a measurement sheet (NO in Step S5601), the patch image is not read by the color sensor 400, and the update of the cooling time Tcool is not required to be determined. Thus, the CPU 901 brings the cooling portion passage sequence to an end.

(Conveyance Sequence)

Figure 9C:
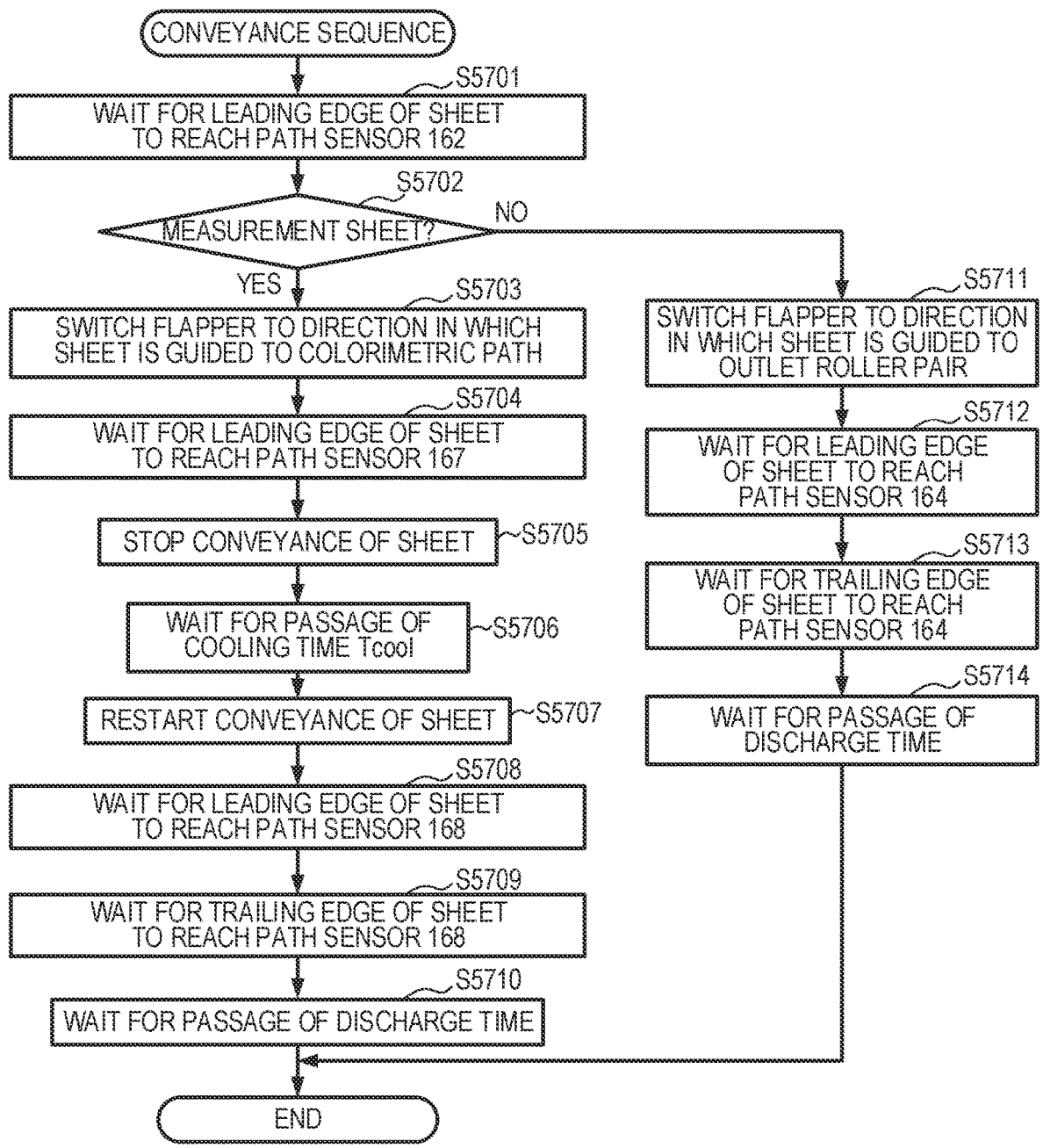

Now, the conveyance sequence executed in Step S57 of FIG. 7 is described with reference to FIG. 9C. FIG. 9C is a flow chart for illustrating the conveyance sequence. When the conveyance sequence is started, the CPU 901 serving as a conveyance controller waits for the leading edge of the sheet to reach the path sensor (conveyance sensor) 162 (Step S5701). The path sensor 162 is arranged upstream of the flapper 163 in the sheet conveyance direction CD. When the leading edge of the sheet reaches the path sensor 162, the CPU 901 determines whether or not the conveyed sheet is a measurement sheet (Step S5702). When the conveyed sheet is a measurement sheet (YES in Step S5702), the CPU 901 switches the flapper 163 to the direction for guiding the sheet to the colorimetric path 503 including the color sensor 400 (Step S5703).

The CPU 901 waits for the leading edge of the sheet to reach the path sensor (color measurement path conveyance sensor) 167 (Step S5704). The path sensor 167 is arranged upstream of the color sensor 400 in the sheet conveyance direction CD. When the leading edge of the sheet reaches the path sensor 167, the CPU 901 stops the conveyance of the sheet (Step S5705). The CPU 901 waits for the passage of the cooling time Tcool stored in the RAM 903 (Step S5706). When the cooling time Tcool has elapsed, the CPU 901 restarts the conveyance of the sheet (Step S5707). The color sensor 400 reads the patch image formed on the sheet.

The CPU 901 waits for the leading edge of the sheet to reach the path sensor (discharge sensor) 168 (Step S5708).

When the leading edge of the sheet reaches the path sensor 168, the CPU 901 waits for the trailing edge of the sheet to reach the path sensor 168 (Step S5709). When the trailing edge of the sheet reaches the path sensor 168, the CPU 901 waits for the passage of a discharge time to be taken until the trailing edge of the sheet has been discharged onto the measurement sheet discharge tray 191 by the discharge roller pair 169 (Step S5710). Then, the CPU 901 brings the conveyance sequence to an end.

Meanwhile, when the conveyed sheet is a non-measurement sheet (NO in Step S5702), the CPU 901 switches the flapper 163 in a direction for guiding the sheet to the outlet roller pair 165 (Step S5711). The CPU 901 waits for the leading edge of the sheet to reach the path sensor (outlet sensor) 164 (Step S5712). When the leading edge of the sheet reaches the path sensor 164, the CPU 901 waits for the trailing edge of the sheet to reach the path sensor 164 (Step S5713). When the trailing edge of the sheet reaches the path sensor 164, the CPU 901 waits for the passage of a discharge time to be taken until the trailing edge of the sheet has been discharged onto the discharge tray 190 by the outlet roller pair 165 (Step S5714). Then, the CPU 901 brings the conveyance sequence to an end.

According to the first embodiment, the cooling time for a sheet to be used before the patch image formed on the sheet is read by the color sensor 400 can be determined based on the state of the cooling portion 30. According to the first embodiment, the time to be taken after the sheet has passed through the fixing portion 13 until the color sensor 400 starts the measurement is determined based on presence or absence of the cooling portion 30 mounted to the image forming apparatus 1 and the failure state of the cooling portion 30, to thereby be able to control the conveyance of the sheet. Accordingly, a wasteful waiting time can be reduced.

Second Embodiment

Now, description of made of a second embodiment. In the second embodiment, the same structure as that of the first embodiment is denoted by the same reference symbol, and description thereof is omitted. An image forming apparatus 701 according to the second embodiment differs from the image forming apparatus 1 according to the first embodiment in that the image forming apparatus 701 includes a plurality of cooling portions (30 and 31). The differences are mainly described below.

(Image Forming Apparatus)

Figure 10:
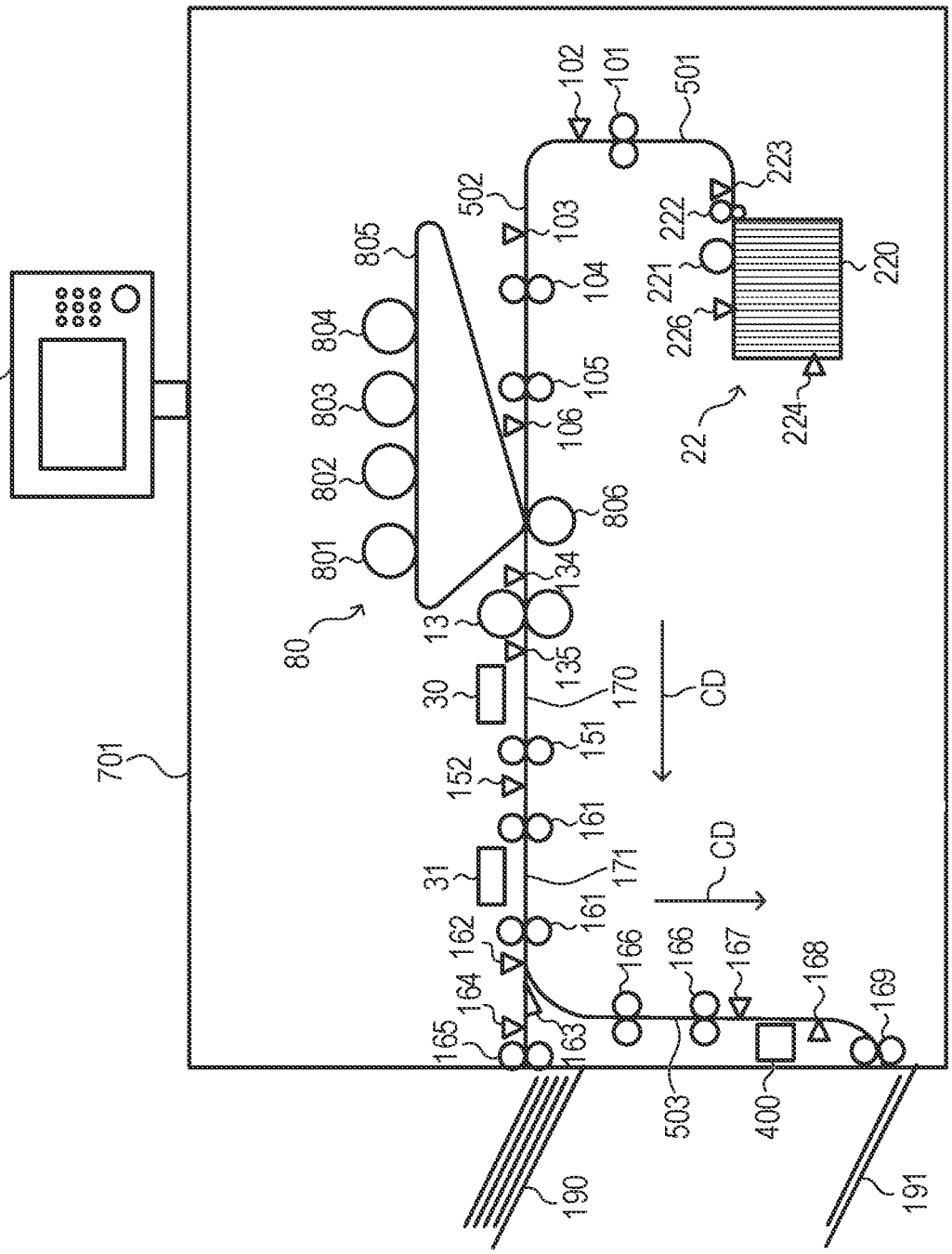
FIG. 10 is a cross-sectional view of an image forming apparatus according to a second embodiment.
Figure 11:
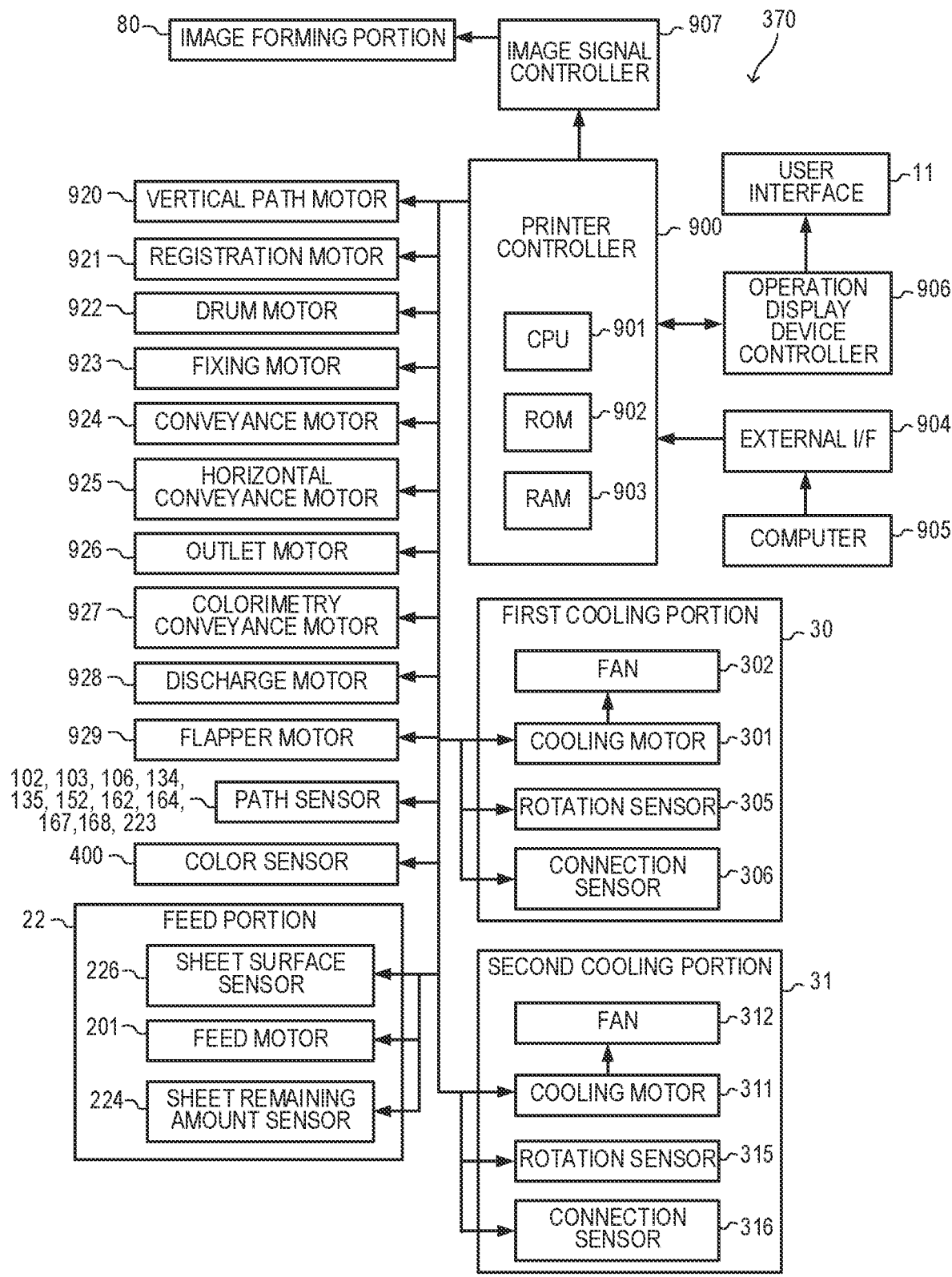
FIG. 11 is a block diagram of a controller in the second embodiment.

FIG. 10 is a cross-sectional view of the image forming apparatus 701 according to the second embodiment. A first cooling portion 30 and a second cooling portion 31 are selectively connected to the image forming apparatus 701. That is, the first cooling portion 30 and the second cooling portion 31 are each connected removably to the image forming apparatus 701. The first cooling portion 30 serving as a first cooling device and the second cooling portion 31 serving as a second cooling device can be installed between the fixing portion 13 and the color sensor 400. The first cooling portion 30 is the same as the cooling portion 30 in the first embodiment, and hence description thereof is omitted. The second cooling portion 31 includes a cooling fan (hereinafter referred to as "fan") 312 as illustrated in FIG. 11. The second cooling portion 31 is configured to drive the fan 312 to send air toward a conveyance path 171, to thereby send air to the sheet being conveyed along the conveyance path 171 by the horizontal conveyance roller pairs 161. The other structures of the image forming apparatus 701 are the same as those of the image forming apparatus 1 according to the first embodiment, and hence description thereof is omitted.

(Controller)

FIG. 11 is a block diagram of a controller 370 in the second embodiment. The controller 370 is configured to control the entire image forming apparatus 701. The first cooling portion 30 includes the connection sensor 306, the fan 302, the cooling motor 301, and the rotation sensor 305. The connection sensor 306 serving as a first connection detector is configured to detect whether or not the first cooling portion 30 is mounted to the image forming apparatus 701. The cooling motor 301 is configured to drive the fan 302. The rotation sensor 305 serving as a first operation detector is configured to detect whether or not the fan 302 is operating (rotating). The second cooling portion 31 includes a connection sensor 316, the fan 312, a cooling motor 311, and a rotation sensor 315. The connection sensor 316 serving as a second connection detector is configured to detect whether or not the second cooling portion 31 is mounted to the image forming apparatus 701. The cooling motor 311 is configured to drive the fan 312. The rotation sensor 315 serving as a second operation detector is configured to detect whether or not the fan 312 is operating (rotating). In the second embodiment, the second cooling portion 31 has the same structure as that of the first cooling portion 30. However, the second cooling portion 31 may have a different structure from that of the first cooling portion 30.

When it is not detected that the fan 302 and/or the fan 312 is rotating even after a predetermined time has elapsed since the driving of the fan 302 and/or the fan 312 was started, the printer controller 900 determines that the fan 302 and/or the fan 312 has failed. The printer controller 900 stores failure information of the fan 302 and/or the fan 312 into the RAM 903. When the failure information of the fan 302 and/or the fan 312 is stored into the RAM 903, the printer controller 900 causes the operation display device controller 906 to display on the user interface 11 that the fan 302 and/or the fan 312 has failed. However, even when the fan 302 and/or the fan 312 fails, the failure exerts no influence on the conveyance of the sheet, and hence a print job is not prohibited.

The color sensor 400, the method of setting the sheet information, the method of executing the adjustment mode, the print sequence, and the print page sequence in the second embodiment are the same as those in the first embodiment, and hence description thereof is omitted. In the second embodiment, the cooling time obtaining sequence executed in Step S52 and the cooling portion passage sequence executed in Step S56, which are included in the print page sequence in the first embodiment illustrated in FIG. 7, are different from those in the first embodiment. The cooling time obtaining sequence and the cooling portion passage sequence in the second embodiment are described below.

(Cooling Time Obtaining Sequence)

Figure 12E:
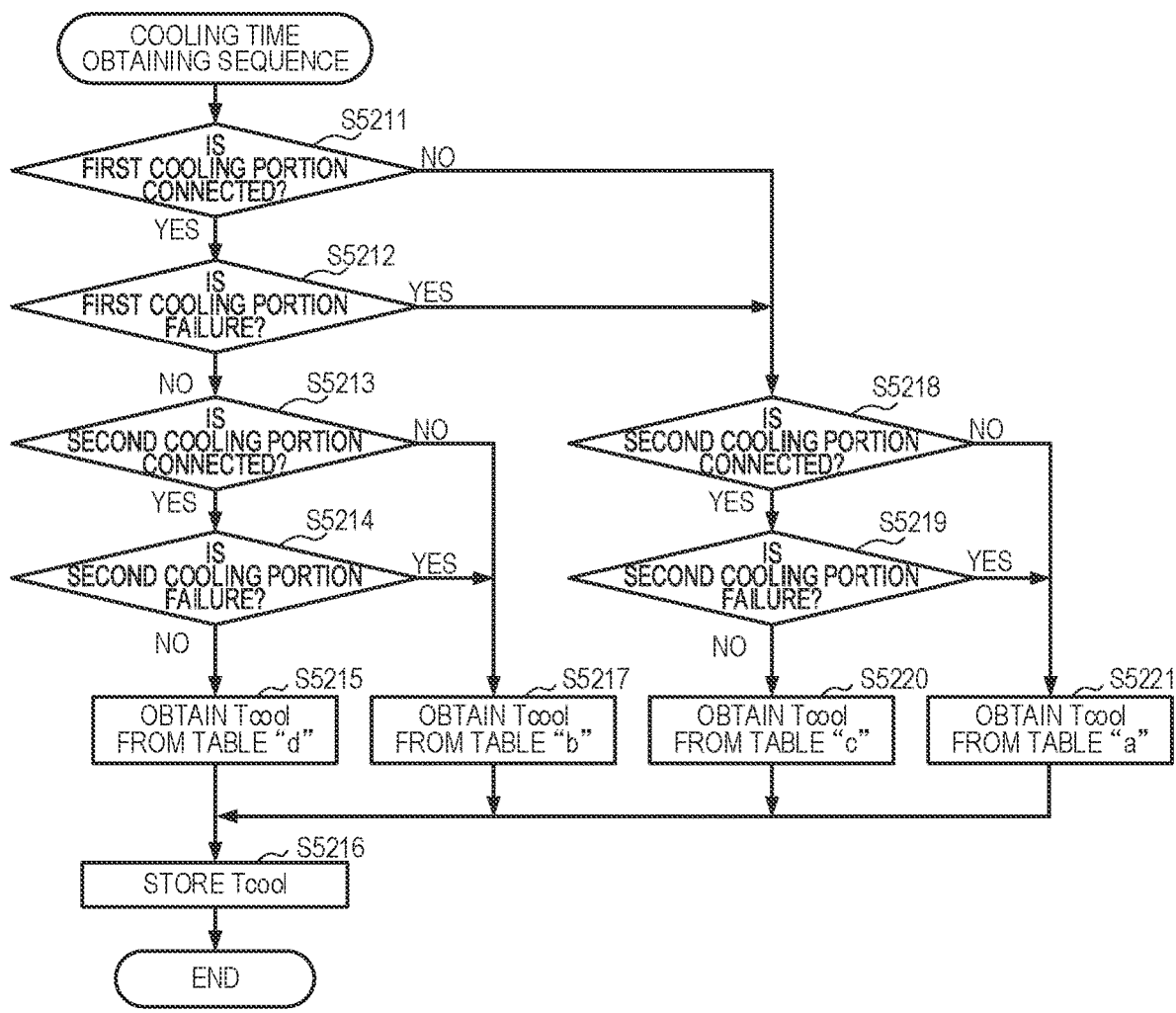

Now, the cooling time obtaining sequence executed in Step S52 of FIG. 7 in the second embodiment is described with reference to FIG. 12A, FIG. 12B, FIG. 12C, FIG. 12D, and FIG. 12E. FIG. 12A, FIG. 12B, FIG. 12C, FIG. 12D, and FIG. 12E are explanatory tables and flow chart of the cooling time obtaining sequence in the second embodiment. FIG. 12A, FIG. 12B, FIG. 12C, and FIG. 12D are Table "a", Table "b", Table "c", and Table "d", respectively, each of which is a cooling time table showing a relationship among the basis weight, the sheet type, and the cooling time Tcool. FIG. 12E is a flow chart for illustrating the cooling time obtaining sequence in the second embodiment. The CPU 901 obtains the cooling time Tcool for cooling a sheet from Table "a", Table "b", Table "c", and Table "d", in accordance with the cooling time obtaining sequence illustrated in FIG. 12E.

When the cooling time obtaining sequence is started, the CPU 901 determines whether or not the first cooling portion 30 is connected to the image forming apparatus 701 based on a detection signal of the connection sensor 306 (Step S5211). When the first cooling portion 30 is connected to the image forming apparatus 701 (YES in Step S5211), the CPU 901 refers to the failure information of the first cooling portion 30 stored in the RAM 903 to determine whether or not the first cooling portion 30 has failed (Step S5212). When the first cooling portion 30 has not failed (NO in Step S5212), the CPU 901 determines whether or not the second cooling portion 31 is connected to the image forming apparatus 701 based on a detection signal of the connection sensor 316 (Step S5213).

When the second cooling portion 31 is connected to the image forming apparatus 701 (YES in Step S5213), the CPU 901 refers to the failure information of the second cooling portion 31 stored in the RAM 903 to determine whether or not the second cooling portion 31 has failed (Step S5214). When the second cooling portion 31 has not failed (NO in Step S5214), the first cooling portion 30 and the second cooling portion 31 are both in a state of being able to cool the sheet. The CPU 901 obtains the cooling time Tcool (first time) from Table "d" shown in FIG. 12D based on the set basis weight and sheet type (Step S5215).

When the second cooling portion 31 is not connected to the image forming apparatus 701 (NO in Step S5213) or when the second cooling portion 31 has failed (YES in Step S5214), the first cooling portion 30 can cool the sheet, but the second cooling portion 31 is not in a state of being able to cool the sheet. The CPU 901 obtains the cooling time Tcool (second time) from Table "b" shown in FIG. 12B based on the set basis weight and sheet type (Step S5217).

When the first cooling portion 30 is not connected to the image forming apparatus 701 (NO in Step S5211) or when the first cooling portion 30 has failed (YES in Step S5212), the CPU 901 advances the processing to Step S5218. The CPU 901 determines whether or not the second cooling portion 31 is connected to the image forming apparatus 701 based on a detection result obtained by the connection sensor 316 (Step S5218). When the second cooling portion 31 is connected to the image forming apparatus 701 (YES in Step S5218), the CPU 901 refers to the failure information of the second cooling portion 31 stored in the RAM 903 to determine whether or not the second cooling portion 31 has failed (Step S5219). When the second cooling portion 31 has not failed (NO in Step S5219), the first cooling portion 30 cannot cool the sheet, but the second cooling portion 31 is in a state of being able to cool the sheet. The CPU 901 obtains the cooling time Tcool (third time) from Table "c" shown in FIG. 12C based on the set basis weight and sheet type (Step S5220).

When the second cooling portion 31 is not connected to the image forming apparatus 701 (NO in Step S5218) or when the second cooling portion 31 has failed (YES in Step S5219), the first cooling portion 30 and the second cooling portion 31 are both in a state of being unable to cool the sheet. The CPU 901 obtains the cooling time Tcool (fourth time) from Table "a" shown in FIG. 12A based on the set basis weight and sheet type (Step S5221). In one embodiment, the cooling time Tcool (first time) of Table "d" is shorter than the cooling time Tcool (second time) of Table "b", the cooling time Tcool (third time) of Table "c", and the cooling time Tcool (fourth time) of Table "a".

The CPU 901 stores the obtained cooling time Tcool into the RAM 903 (Step S5216). Then, the CPU 901 brings the cooling time obtaining sequence to an end. According to the second embodiment, the cooling time Tcool is changed based on a valid state or an invalid state of the cooling function of each of the first cooling portion 30 and the second cooling portion 31, to thereby be able to optimize a time from image formation to patch image reading.

(Cooling Portion Passage Sequence)

Figure 13:
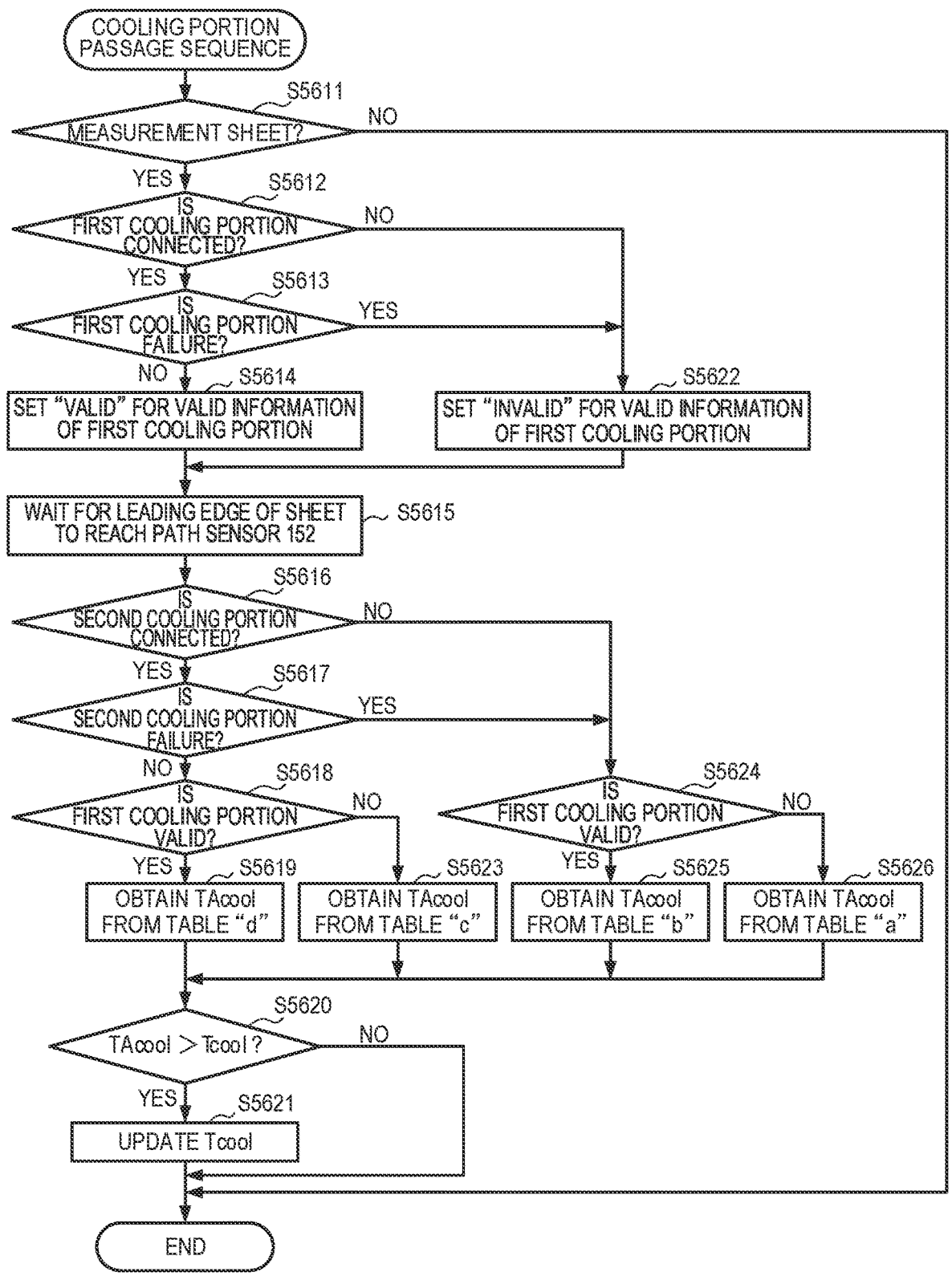
FIG. 13 is a flow chart for illustrating a cooling portion passage sequence in the second embodiment.

Now, the cooling portion passage sequence in the second embodiment executed in Step S56 of FIG. 7 is described with reference to FIG. 12A, FIG. 12B, FIG. 12C, FIG. 12D, and FIG. 13. FIG. 13 is a flow chart for illustrating the cooling portion passage sequence in the second embodiment. When the cooling portion passage sequence is started, the CPU 901 determines whether or not the print page is a page for a measurement sheet from which a patch image is to be read by the color sensor 400 (Step S5611). When the print page is a page for a measurement sheet (YES in Step S5611), the CPU 901 determines whether or not the first cooling portion 30 is connected to the image forming apparatus 701 based on the detection signal of the connection sensor 306 (Step S5612).

When the first cooling portion 30 is connected to the image forming apparatus 701 (YES in Step S5612), the CPU 901 refers to the failure information of the first cooling portion 30 stored in the RAM 903 to determine whether or not the first cooling portion 30 has failed (Step S5613). When the first cooling portion 30 has not failed (NO in Step S5613), the CPU 901 sets "valid" for validity information of the first cooling portion 30 stored in the RAM 903 (Step S5614), and waits for the leading edge of the sheet to reach the path sensor 152 (Step S5615). When the first cooling portion 30 is not connected to the image forming apparatus 701 (NO in Step S5612) or when the first cooling portion 30 has failed (YES in Step S5613), the CPU 901 sets "invalid" for the validity information of the first cooling portion 30 stored in the RAM 903 (Step S5622). That is, the CPU 901 determines whether or not the cooling function of the first cooling portion 30 is valid. The CPU 901 waits for the leading edge of the sheet to reach the path sensor 152 (Step S5615).

When the leading edge of the sheet reaches the path sensor 152, the CPU 901 determines whether or not the second cooling portion 31 is connected to the image forming apparatus 701 based on the detection result obtained by the connection sensor 316 (Step S5616). When the second cooling portion 31 is connected to the image forming apparatus 701 (YES in Step S5616), the CPU 901 refers to the failure information of the second cooling portion 31 stored in the RAM 903 to determine whether or not the second cooling portion 31 has failed (Step S5617). That is, the CPU 901 determines whether or not the cooling function of the second cooling portion 31 is valid. When the second cooling portion 31 has not failed (NO in Step S5617), the CPU 901 refers to the validity information of the first cooling portion 30 stored in the RAM 903 to determine whether or not the first cooling portion 30 is in a valid state (Step S5618).

When the first cooling portion 30 is in a valid state (YES in Step S5618), the first cooling portion 30 and the second cooling portion 31 are both in a state of being able to cool the sheet. The CPU 901 obtains the cooling time TAcool from Table "d" shown in FIG. 12D based on the set basis weight and sheet type (Step S5619). Meanwhile, when the first cooling portion 30 is in an invalid state (NO in Step S5618), the first cooling portion 30 is in a state of being unable to cool the sheet, and the second cooling portion 31 is in a state of being able to cool the sheet. The CPU 901 obtains the cooling time TAcool from Table "c" shown in FIG. 12C based on the set basis weight and sheet type.

When the second cooling portion 31 is not connected to the image forming apparatus 701 (NO in Step S5616) or when the second cooling portion 31 has failed (YES in Step S5617), the CPU 901 advances the processing to Step S5624. The CPU 901 refers to the validity information of the first cooling portion 30 stored in the RAM 903 to determine whether or not the first cooling portion 30 is in a valid state (Step S5624).

When the first cooling portion 30 is in a valid state (YES in Step S5624), the first cooling portion 30 is in a state of being able to cool the sheet, and the second cooling portion 31 is in a state of being unable to cool the sheet. The CPU 901 obtains the cooling time TAcool from Table "b" shown in FIG. 12B based on the set basis weight and sheet type (Step S5625). When the first cooling portion 30 is in an invalid state (NO in Step S5624), the first cooling portion 30 and the second cooling portion 31 are both in a state of being unable to cool the sheet. The CPU 901 obtains the cooling time TAcool from Table "a" shown in FIG. 12A based on the set basis weight and sheet type (Step S5626).

The CPU 901 compares the cooling time TAcool obtained in Step S5619, Step S5623, Step S5625, or Step S5626 with the cooling time Tcool stored in the RAM 903 in the cooling time obtaining sequence (Step S5620). When the obtained cooling time TAcool is greater than the stored cooling time Tcool (YES in Step S5620), the CPU 901 updates the stored cooling time Tcool with the obtained cooling time TAcool (Step S5621). Then, the CPU 901 brings the cooling portion passage sequence to an end.

There is a conceivable case in which the first cooling portion 30 and/or the second cooling portion 31 did not fail at the time of executing the cooling time obtaining sequence but later fails during the execution of the image forming sequence. In this case, the sheet is not cooled by the first cooling portion 30 and/or the second cooling portion 31, and hence the sheet is not sufficiently cooled within the cooling time Tcool determined at the time of executing the cooling time obtaining sequence, and the measurement cannot be correctly performed by the color sensor 400. In view of this, the state of the first cooling portion 30 and/or the second cooling portion 31 is re-examined in the cooling portion passage sequence, and the cooling time Tcool is updated when the first cooling portion 30 and/or the second cooling portion 31 is in an invalid state.

When the print page is not a measurement sheet (NO in Step S5611), the patch image is not read by the color sensor 400, and the update of the cooling time Tcool is not required to be determined. Thus, the CPU 901 brings the cooling portion passage sequence to an end. In addition, when the obtained cooling time TAcool is equal to or less than the stored cooling time Tcool (NO in Step S5620), the CPU 901 brings the cooling portion passage sequence to an end without updating the cooling time Tcool.

In the second embodiment, the first cooling portion 30 and the second cooling portion 31 have the same structure, and hence the same cooling times Tcool are set in Table "b" shown in FIG. 12B and Table "c" shown in FIG. 12C. However, when the first cooling portion 30 and the second cooling portion 31 have different structures and are different in cooling capacity, different cooling times Tcool may be set as shown in FIG. 14A, FIG. 14B, FIG. 14C, and FIG. 14D.

According to the second embodiment, the cooling time for a sheet to be used before the patch image formed on the sheet is read by the color sensor 400 can be determined based on the states of the first cooling portion 30 and the second cooling portion 31. According to the second embodiment, the time to be taken after the sheet has passed through the fixing portion 13 until the color sensor 400 starts the measurement is determined based on the states of the first cooling portion 30 and the second cooling portion 31, to thereby be able to control the conveyance of the sheet. Accordingly, a wasteful waiting time can be reduced.

In the first and second embodiments described above, the cooling portion is arranged in a casing including the fixing portion 13, but may be arranged in a separate casing.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-020659, filed Feb. 10, 2020, which is hereby incorporated by reference herein in its entirety.

What is claimed is:

1. An image forming apparatus comprising:
a forming unit configured to form a measurement image on a sheet;
a fixing unit configured to heat the measurement image to fix the measurement image;
a measurement unit which is provided downstream of the fixing unit in a conveyance direction of the sheet, and is configured to measure a color of the fixed measurement image;
a connection detector configured to detect whether a cooling device having a cooling function is connected between the fixing unit and the measurement unit; and
a controller configured to control, in a case in which the connection detector detects that the cooling device is connected, conveyance of the sheet so that a time from when the sheet passes through the fixing unit to when the measurement unit starts measuring the color of the fixed measurement image becomes a first time, and control, in a case in which the connection detector does not detect that the cooling device is connected, the conveyance of the sheet so that the time becomes a second time longer than the first time.

2. The image forming apparatus according to claim 1, further comprising an operation detector configured to detect that the cooling device is operative,
wherein the controller is configured to control, in a case in which the connection detector detects that the cooling device is connected and the operation detector detects that the cooling device is operative, the conveyance of the sheet so that the time becomes the first time, and control, in the case in which the connection detector does not detect that the cooling device is connected or in a case in which the operation detector does not detect that the cooling device is operative, the conveyance of the sheet so that the time becomes the second time.

3. The image forming apparatus according to claim 1, wherein the image forming apparatus is configured to execute image formation even when the cooling device is not mounted to the image forming apparatus.

4. The image forming apparatus according to claim 1, further comprising a sensor arranged upstream of the measurement unit in the conveyance direction, wherein the controller is configured to stop the conveyance of the sheet when the sensor detects the sheet.

5. An image forming apparatus comprising:
- a forming unit configured to form a measurement image on a sheet;
- a fixing unit configured to heat the measurement image to fix the measurement image;
- a measurement unit which is provided downstream of the fixing unit in a conveyance direction of the sheet, and is configured to measure a color of the fixed measurement image;
- a first connection detector configured to detect whether a first cooling device having a cooling function is connected between the fixing unit and the measurement unit;
- a second connection detector configured to detect whether a second cooling device having a cooling function is connected between the fixing unit and the measurement unit; and
- a controller configured to control, in a case in which it is detected that the first cooling device and the second cooling device are connected, respectively, from a detection result of the first connection detector and a detection result of the second connection detector, conveyance of the sheet so that a time from when the sheet passes through the fixing unit to when the measurement unit starts measuring the color of the fixed measurement image becomes a first time, and control, in a case in which it is detected that the first cooling device is connected but the second cooling device is not connected, the conveyance of the sheet so that the time becomes a second time, and control, in a case in which it is detected that the second cooling device is connected but the first cooling device is not connected, the conveyance of the sheet so that the time becomes a third time, and control, in a case in which it is detected that the first cooling device and the second cooling device are not connected, respectively, the conveyance of the sheet so that the time becomes a fourth time, wherein the first time is shorter than the second time, the third time, or the fourth time.

6. An image forming apparatus comprising:
- a forming unit configured to form a measurement image on a sheet;
- a fixing unit configured to heat the measurement image to fix the measurement image;
- a measurement unit which is provided downstream of the fixing unit in a conveyance direction of the sheet, and is configured to measure a color of the fixed measurement image;
- an operation detector configured to detect whether a cooling device having a cooling function is operative, the cooling device being connected between the fixing unit and the measurement unit; and
- a controller configured to control, in a case in which the operation detector detects that the cooling device is operative, conveyance of the sheet so that a time from when the sheet passes through the fixing unit to when the measurement unit starts measuring the color of the fixed measurement image becomes a first time, and control, in a case in which the operation detector does not detect that the cooling device is operative, the conveyance of the sheet so that the time becomes a second time longer than the first time.

* * * * *